US012621642B2

(12) United States Patent
Rule et al.

(10) Patent No.: US 12,621,642 B2
(45) Date of Patent: May 5, 2026

(54) SYSTEMS AND METHODS FOR DEVICE CASE DETECTION FOR ADAPTIVE NEAR FIELD COMMUNICATION

(71) Applicant: Capital One Services, LLC, McLean, VA (US)

(72) Inventors: Jeffrey Rule, Chevy Chase, MD (US); Kevin Osborn, Newton Highlands, MA (US)

(73) Assignee: Capital One Services, LLC, McLean, VA (US)

( * ) Notice: Subject to any disclaimer, the term of this patent is extended or adjusted under 35 U.S.C. 154(b) by 347 days.

(21) Appl. No.: 18/118,680

(22) Filed: Mar. 7, 2023

(65) Prior Publication Data

US 2024/0305964 A1     Sep. 12, 2024

(51) Int. Cl.
*H04W 4/80*         (2018.01)
*H04W 12/06*        (2021.01)

(52) U.S. Cl.
CPC ............. *H04W 4/80* (2018.02); *H04W 12/06* (2013.01)

(58) Field of Classification Search
CPC ........ H04W 4/80; H04W 12/06; H04W 64/00
See application file for complete search history.

(56) References Cited

U.S. PATENT DOCUMENTS

| | | |
|---|---|---|
| 4,683,553 A | 7/1987 | Mollier |
| 4,827,113 A | 5/1989 | Rikuna |
| 4,910,773 A | 3/1990 | Hazard et al. |
| 5,036,461 A | 7/1991 | Elliott et al. |
| 5,363,448 A | 11/1994 | Koopman, Jr. et al. |
| 5,377,270 A | 12/1994 | Koopman, Jr. et al. |
| 5,533,126 A | 7/1996 | Hazard |
| 5,537,314 A | 7/1996 | Kanter |

(Continued)

FOREIGN PATENT DOCUMENTS

| | | |
|---|---|---|
| CA | 3010336 | 7/2017 |
| CN | 101192295 | 6/2008 |

(Continued)

OTHER PUBLICATIONS

Batina, Lejla and Poll, Erik, "SmartCards and RFID," PowerPoint Presentation for IPA Security Course, Digital Security at University of Nijmegen, Netherlands (date unknown), 75 pages.

(Continued)

*Primary Examiner* — Tuan H Nguyen
(74) *Attorney, Agent, or Firm* — KDW Firm PLLC; Andrew D. Kasnevich

(57)         ABSTRACT

Example embodiments of systems and methods for adaptive near field communication include receiving, by an application comprising instructions for execution on a client device, data indicating a type of device from the client device and performing, by the application, at least one selected from the group of an explicit detection process and an implicit detection process to determine a type of case expected to house the client device. Example embodiments further provide determining, by the application, an optimal positioning of a transmitting device for near field communication with the client device based on the type of device and type of case, and displaying, by the application, an indication of an optimal positioning of the transmitting device for near field communication.

20 Claims, 9 Drawing Sheets

100

(56) References Cited

U.S. PATENT DOCUMENTS

| | | | |
|---|---|---|---|
| 5,590,038 A | 12/1996 | Pitroda |
| 5,592,553 A | 1/1997 | Guski et al. |
| 5,616,901 A | 4/1997 | Crandall |
| 5,666,415 A | 9/1997 | Kaufman |
| 5,764,789 A | 6/1998 | Pare, Jr. et al. |
| 5,768,373 A | 6/1998 | Lohstroh et al. |
| 5,778,072 A | 7/1998 | Samar |
| 5,796,827 A | 8/1998 | Coppersmith et al. |
| 5,832,090 A | 11/1998 | Raspotnik |
| 5,883,810 A | 3/1999 | Franklin et al. |
| 5,901,874 A | 5/1999 | Deters |
| 5,929,413 A | 7/1999 | Gardner |
| 5,960,411 A | 9/1999 | Hartman et al. |
| 6,021,203 A | 2/2000 | Douceur et al. |
| 6,049,328 A | 4/2000 | Vanderheiden |
| 6,058,373 A | 5/2000 | Blinn et al. |
| 6,061,666 A | 5/2000 | Do et al. |
| 6,105,013 A | 8/2000 | Curry et al. |
| 6,199,114 B1 | 3/2001 | White et al. |
| 6,199,762 B1 | 3/2001 | Hohle |
| 6,216,227 B1 | 4/2001 | Goldstein et al. |
| 6,227,447 B1 | 5/2001 | Campisano |
| 6,282,522 B1 | 8/2001 | Davis et al. |
| 6,324,271 B1 | 11/2001 | Sawyer et al. |
| 6,342,844 B1 | 1/2002 | Rozin |
| 6,367,011 B1 | 4/2002 | Lee et al. |
| 6,402,028 B1 | 6/2002 | Graham, Jr. et al. |
| 6,438,550 B1 | 8/2002 | Doyle et al. |
| 6,501,847 B2 | 12/2002 | Helot et al. |
| 6,572,015 B1 | 6/2003 | Norton |
| 6,631,197 B1 | 10/2003 | Taenzer |
| 6,641,050 B2 | 11/2003 | Kelley et al. |
| 6,655,585 B2 | 12/2003 | Shinn |
| 6,662,020 B1 | 12/2003 | Aaro et al. |
| 6,721,706 B1 | 4/2004 | Strubbe et al. |
| 6,731,778 B1 | 5/2004 | Oda et al. |
| 6,779,115 B1 | 8/2004 | Naim |
| 6,792,533 B2 | 9/2004 | Jablon |
| 6,829,711 B1 | 12/2004 | Kwok et al. |
| 6,834,271 B1 | 12/2004 | Hodgson et al. |
| 6,834,795 B1 | 12/2004 | Rasmussen et al. |
| 6,852,031 B1 | 2/2005 | Rowe |
| 6,865,547 B1 | 3/2005 | Brake, Jr. et al. |
| 6,873,260 B2 | 3/2005 | Lancos et al. |
| 6,877,656 B1 | 4/2005 | Jaros et al. |
| 6,889,198 B2 | 5/2005 | Kawan |
| 6,905,411 B2 | 6/2005 | Nguyen et al. |
| 6,910,627 B1 | 6/2005 | Simpson-Young et al. |
| 6,971,031 B2 | 11/2005 | Haala |
| 6,990,588 B1 | 1/2006 | Yasukura |
| 7,006,986 B1 | 2/2006 | Sines et al. |
| 7,085,931 B1 | 8/2006 | Smith et al. |
| 7,127,605 B1 | 10/2006 | Montgomery et al. |
| 7,128,274 B2 | 10/2006 | Kelley et al. |
| 7,140,550 B2 | 11/2006 | Ramachandran |
| 7,152,045 B2 | 12/2006 | Hoffman |
| 7,165,727 B2 | 1/2007 | de Jong |
| 7,175,076 B1 | 2/2007 | Block et al. |
| 7,202,773 B1 | 4/2007 | Oba et al. |
| 7,206,806 B2 | 4/2007 | Pineau |
| 7,232,073 B1 | 6/2007 | de Jong |
| 7,246,752 B2 | 7/2007 | Brown |
| 7,252,242 B2 | 8/2007 | Ho |
| 7,254,569 B2 | 8/2007 | Goodman et al. |
| 7,263,507 B1 | 8/2007 | Brake, Jr. et al. |
| 7,270,276 B2 | 9/2007 | Vayssiere |
| 7,278,025 B2 | 10/2007 | Saito et al. |
| 7,287,692 B1 | 10/2007 | Patel et al. |
| 7,290,709 B2 | 11/2007 | Tsai et al. |
| 7,306,143 B2 | 12/2007 | Bonneau, Jr. et al. |
| 7,319,986 B2 | 1/2008 | Praisner et al. |
| 7,325,132 B2 | 1/2008 | Takayama et al. |
| 7,373,515 B2 | 5/2008 | Owen et al. |
| 7,374,099 B2 | 5/2008 | de Jong |
| 7,375,616 B2 | 5/2008 | Rowse et al. |
| 7,380,710 B2 | 6/2008 | Brown |
| 7,424,977 B2 | 9/2008 | Smets et al. |
| 7,453,439 B1 | 11/2008 | Kushler et al. |
| 7,472,829 B2 | 1/2009 | Brown |
| 7,487,357 B2 | 2/2009 | Smith et al. |
| 7,527,208 B2 | 5/2009 | Hammad |
| 7,568,631 B2 | 8/2009 | Gibbs et al. |
| 7,584,153 B2 | 9/2009 | Brown et al. |
| 7,597,250 B2 | 10/2009 | Finn |
| 7,628,322 B2 | 12/2009 | Holtmanns et al. |
| 7,652,578 B2 | 1/2010 | Braun et al. |
| 7,689,832 B2 | 3/2010 | Talmor et al. |
| 7,703,142 B1 | 4/2010 | Wilson et al. |
| 7,748,609 B2 | 7/2010 | Sachdeva et al. |
| 7,748,617 B2 | 7/2010 | Gray |
| 7,748,636 B2 | 7/2010 | Finn |
| 7,762,457 B2 | 7/2010 | Bonalle et al. |
| 7,789,302 B2 | 9/2010 | Tame |
| 7,793,851 B2 | 9/2010 | Mullen |
| 7,796,013 B2 | 9/2010 | Murakami et al. |
| 7,801,799 B1 | 9/2010 | Brake, Jr. et al. |
| 7,801,829 B2 | 9/2010 | Gray et al. |
| 7,805,755 B2 | 9/2010 | Brown et al. |
| 7,809,643 B2 | 10/2010 | Phillips et al. |
| 7,827,115 B2 | 11/2010 | Weller et al. |
| 7,828,214 B2 | 11/2010 | Narendra et al. |
| 7,848,746 B2 | 12/2010 | Juels |
| 7,882,553 B2 | 2/2011 | Tuliani |
| 7,900,048 B2 | 3/2011 | Andersson |
| 7,908,216 B1 | 3/2011 | Davis et al. |
| 7,922,082 B2 | 4/2011 | Muscato |
| 7,933,589 B1 | 4/2011 | Mamdani et al. |
| 7,949,559 B2 | 5/2011 | Freiberg |
| 7,954,716 B2 | 6/2011 | Narendra et al. |
| 7,954,723 B2 | 6/2011 | Charrat |
| 7,962,369 B2 | 6/2011 | Rosenberg |
| 7,993,197 B2 | 8/2011 | Mamdani et al. |
| 8,005,426 B2 | 8/2011 | Huomo et al. |
| 8,010,405 B1 | 8/2011 | Bortolin et al. |
| RE42,762 E | 9/2011 | Shin |
| 8,041,954 B2 | 10/2011 | Plesman |
| 8,060,012 B2 | 11/2011 | Sklovsky et al. |
| 8,074,877 B2 | 12/2011 | Mullen et al. |
| 8,082,450 B2 | 12/2011 | Frey et al. |
| 8,095,113 B2 | 1/2012 | Kean et al. |
| 8,099,332 B2 | 1/2012 | Lemay et al. |
| 8,103,249 B2 | 1/2012 | Markison |
| 8,108,687 B2 | 1/2012 | Ellis et al. |
| 8,127,143 B2 | 2/2012 | Abdallah et al. |
| 8,135,648 B2 | 3/2012 | Oram et al. |
| 8,140,010 B2 | 3/2012 | Symons et al. |
| 8,141,136 B2 | 3/2012 | Lee et al. |
| 8,150,321 B2 | 4/2012 | Winter et al. |
| 8,150,767 B2 | 4/2012 | Wankmueller |
| 8,186,602 B2 | 5/2012 | Itay et al. |
| 8,196,131 B1 | 6/2012 | von Behren et al. |
| 8,215,563 B2 | 7/2012 | Levy et al. |
| 8,224,753 B2 | 7/2012 | Atef et al. |
| 8,232,879 B2 | 7/2012 | Davis |
| 8,233,841 B2 | 7/2012 | Griffin et al. |
| 8,245,292 B2 | 8/2012 | Buer |
| 8,249,654 B1 | 8/2012 | Zhu |
| 8,266,451 B2 | 9/2012 | Leydier et al. |
| 8,276,814 B1 | 10/2012 | Davis |
| 8,285,329 B1 | 10/2012 | Zhu |
| 8,302,872 B2 | 11/2012 | Mullen |
| 8,312,519 B1 | 11/2012 | Bailey et al. |
| 8,316,237 B1 | 11/2012 | Felsher et al. |
| 8,332,272 B2 | 12/2012 | Fisher |
| 8,346,670 B2 | 1/2013 | Hasson |
| 8,365,988 B1 | 2/2013 | Medina, III et al. |
| 8,369,960 B2 | 2/2013 | Tran et al. |
| 8,371,501 B1 | 2/2013 | Hopkins |
| 8,381,307 B2 | 2/2013 | Cimino |
| 8,391,719 B2 | 3/2013 | Alameh et al. |
| 8,417,231 B2 | 4/2013 | Sanding et al. |
| 8,439,271 B2 | 5/2013 | Smets et al. |
| 8,475,367 B1 | 7/2013 | Yuen et al. |
| 8,489,112 B2 | 7/2013 | Roeding et al. |

(56) References Cited

U.S. PATENT DOCUMENTS

| | | | |
|---|---|---|---|
| 8,511,542 B2 | 8/2013 | Pan | |
| 8,511,547 B2 | 8/2013 | Rans | |
| 8,519,822 B2 | 8/2013 | Riegebauer | |
| 8,559,872 B2 | 10/2013 | Butler | |
| 8,566,916 B1 | 10/2013 | Vernon et al. | |
| 8,567,670 B2 | 10/2013 | Stanfield et al. | |
| 8,572,386 B2 | 10/2013 | Takekawa et al. | |
| 8,577,810 B1 | 11/2013 | Dalit et al. | |
| 8,583,454 B2 | 11/2013 | Beraja et al. | |
| 8,589,335 B2 | 11/2013 | Smith et al. | |
| 8,594,730 B2 | 11/2013 | Bona et al. | |
| 8,615,468 B2 | 12/2013 | Varadarajan | |
| 8,620,218 B2 | 12/2013 | Awad | |
| 8,667,285 B2 | 3/2014 | Coulier et al. | |
| 8,723,941 B1 | 5/2014 | Shirbabadi et al. | |
| 8,726,405 B1 | 5/2014 | Bailey et al. | |
| 8,740,073 B2 | 6/2014 | Vijayshankar et al. | |
| 8,750,514 B2 | 6/2014 | Gallo et al. | |
| 8,752,189 B2 | 6/2014 | De Jong | |
| 8,794,509 B2 | 8/2014 | Bishop et al. | |
| 8,799,668 B2 | 8/2014 | Cheng | |
| 8,806,592 B2 | 8/2014 | Ganesan | |
| 8,807,440 B1 | 8/2014 | Von Behren et al. | |
| 8,811,892 B2 | 8/2014 | Khan et al. | |
| 8,814,039 B2 | 8/2014 | Bishop et al. | |
| 8,814,052 B2 | 8/2014 | Bona et al. | |
| 8,818,867 B2 | 8/2014 | Baldwin et al. | |
| 8,850,538 B1 | 9/2014 | Vernon et al. | |
| 8,861,733 B2 | 10/2014 | Benteo et al. | |
| 8,870,081 B2 | 10/2014 | Olson | |
| 8,880,027 B1 | 11/2014 | Darringer | |
| 8,888,002 B2 | 11/2014 | Chesney et al. | |
| 8,898,088 B2 | 11/2014 | Springer et al. | |
| 8,934,837 B2 | 1/2015 | Zhu et al. | |
| 8,977,569 B2 | 3/2015 | Rao | |
| 8,994,498 B2 | 3/2015 | Agrafioti et al. | |
| 9,004,365 B2 | 4/2015 | Bona et al. | |
| 9,038,893 B2 | 5/2015 | Kirkham | |
| 9,038,894 B2 | 5/2015 | Khalid | |
| 9,042,814 B2 | 5/2015 | Royston et al. | |
| 9,047,531 B2 | 6/2015 | Showering et al. | |
| 9,069,976 B2 | 6/2015 | Toole et al. | |
| 9,081,948 B2 | 7/2015 | Magne | |
| 9,104,853 B2 | 8/2015 | Venkataramani et al. | |
| 9,118,663 B1 | 8/2015 | Bailey et al. | |
| 9,122,964 B2 | 9/2015 | Krawczewicz | |
| 9,129,199 B2 | 9/2015 | Spodak | |
| 9,129,280 B2 | 9/2015 | Bona et al. | |
| 9,152,832 B2 | 10/2015 | Royston et al. | |
| 9,178,369 B2 | 11/2015 | Partovi | |
| 9,183,490 B2 | 11/2015 | Moreton | |
| 9,203,800 B2 | 12/2015 | Izu et al. | |
| 9,209,867 B2 | 12/2015 | Royston | |
| 9,251,330 B2 | 2/2016 | Boivie et al. | |
| 9,251,518 B2 | 2/2016 | Levin et al. | |
| 9,258,715 B2 | 2/2016 | Borghei | |
| 9,270,337 B2 | 2/2016 | Zhu et al. | |
| 9,275,325 B2 | 3/2016 | Newcombe | |
| 9,286,606 B2 | 3/2016 | Diamond | |
| 9,306,626 B2 | 4/2016 | Hall et al. | |
| 9,306,753 B1 | 4/2016 | Vandervort | |
| 9,306,942 B1 | 4/2016 | Bailey et al. | |
| 9,324,066 B2 | 4/2016 | Archer et al. | |
| 9,324,067 B2 | 4/2016 | Van Os et al. | |
| 9,332,587 B2 | 5/2016 | Salahshoor | |
| 9,338,622 B2 | 5/2016 | Bjontegard | |
| 9,373,141 B1 | 6/2016 | Shakkarwar | |
| 9,379,841 B2 | 6/2016 | Fine et al. | |
| 9,413,430 B2 | 8/2016 | Royston et al. | |
| 9,413,768 B1 | 8/2016 | Gregg et al. | |
| 9,420,496 B1 | 8/2016 | Indurkar | |
| 9,426,132 B1 | 8/2016 | Alikhani | |
| 9,432,339 B1 | 8/2016 | Bowness | |
| 9,455,968 B1 | 9/2016 | Machani et al. | |
| 9,473,509 B2 | 10/2016 | Arsanjani et al. | |
| 9,491,626 B2 | 11/2016 | Sharma et al. | |
| 9,501,776 B2 | 11/2016 | Martin | |
| 9,553,637 B2 | 1/2017 | Yang et al. | |
| 9,619,952 B1 | 4/2017 | Zhao et al. | |
| 9,635,000 B1 | 4/2017 | Muftic | |
| 9,665,858 B1 | 5/2017 | Kumar | |
| 9,674,705 B2 | 6/2017 | Rose et al. | |
| 9,679,286 B2 | 6/2017 | Colnot et al. | |
| 9,680,942 B2 | 6/2017 | Dimmick | |
| 9,710,744 B2 | 7/2017 | Wurmfeld | |
| 9,710,804 B2 | 7/2017 | Zhou et al. | |
| 9,740,342 B2 | 8/2017 | Paulsen et al. | |
| 9,740,988 B1 | 8/2017 | Levin et al. | |
| 9,763,097 B2 | 9/2017 | Robinson et al. | |
| 9,767,329 B2 | 9/2017 | Forster | |
| 9,769,662 B1 | 9/2017 | Queru | |
| 9,773,151 B2 | 9/2017 | Mil'shtein et al. | |
| 9,780,953 B2 | 10/2017 | Gaddam et al. | |
| 9,891,823 B2 | 2/2018 | Feng et al. | |
| 9,940,571 B1 | 4/2018 | Herrington | |
| 9,949,065 B1 | 4/2018 | Zarakas | |
| 9,953,323 B2 | 4/2018 | Candelore et al. | |
| 9,961,194 B1 | 5/2018 | Wiechman et al. | |
| 9,965,632 B2 | 5/2018 | Zarakas | |
| 9,965,756 B2 | 5/2018 | Davis et al. | |
| 9,965,911 B2 | 5/2018 | Wishne | |
| 9,977,890 B2 | 5/2018 | Alberti | |
| 9,978,056 B2 | 5/2018 | Seo | |
| 9,978,058 B2 | 5/2018 | Wurmfeld et al. | |
| 9,990,795 B2 | 6/2018 | Wurmfeld | |
| 10,007,873 B2 | 6/2018 | Heo | |
| 10,013,693 B2 | 7/2018 | Wyatt | |
| 10,043,164 B2 | 8/2018 | Dogin et al. | |
| 10,075,437 B1 | 9/2018 | Costigan et al. | |
| 10,121,130 B2 | 11/2018 | Pinski | |
| 10,129,648 B1 | 11/2018 | Hernandez et al. | |
| 10,133,979 B1 | 11/2018 | Eidam et al. | |
| 10,210,505 B2 | 2/2019 | Zarakas | |
| 10,217,105 B1 | 2/2019 | Sangi et al. | |
| 10,242,368 B1 | 3/2019 | Poole | |
| 10,296,910 B1 | 5/2019 | Templeton | |
| 10,332,102 B2 | 6/2019 | Zarakas | |
| 10,360,557 B2 | 7/2019 | Locke | |
| 10,380,471 B2 | 8/2019 | Locke | |
| 10,395,244 B1 | 8/2019 | Mossler | |
| 10,453,054 B2 | 10/2019 | Zarakas | |
| 10,474,941 B2 | 11/2019 | Wurmfeld | |
| 10,475,027 B2 | 11/2019 | Guise | |
| 10,482,453 B2 | 11/2019 | Zarakas | |
| 10,482,457 B2 | 11/2019 | Poole | |
| 10,489,774 B2 | 11/2019 | Zarakas | |
| 10,489,781 B1 | 11/2019 | Osborn | |
| 10,510,070 B2 | 12/2019 | Wurmfeld | |
| 10,515,361 B2 | 12/2019 | Zarakas | |
| 10,535,068 B2 | 1/2020 | Locke | |
| 10,546,444 B2 | 1/2020 | Osborn | |
| 10,581,611 B1 | 3/2020 | Osborn | |
| 10,664,830 B1 | 5/2020 | Rule | |
| 10,685,349 B2 | 6/2020 | Brickell | |
| 10,797,882 B2 | 10/2020 | Rule | |
| 10,838,462 B1 * | 11/2020 | Monaco | G06F 1/324 |
| 10,860,814 B2 * | 12/2020 | Rule | G06Q 20/401 |
| 10,880,741 B2 | 12/2020 | Zarakas | |
| 10,909,525 B1 | 2/2021 | Dhodapkar | |
| 10,970,691 B2 | 4/2021 | Koeppel | |
| 10,984,416 B2 | 4/2021 | Ilincic | |
| 11,037,136 B2 | 6/2021 | Rule | |
| 11,062,098 B1 | 7/2021 | Bergeron | |
| 11,120,453 B2 | 9/2021 | Rule | |
| 11,138,593 B1 | 10/2021 | Ho | |
| 11,138,605 B2 | 10/2021 | Aabye | |
| 11,176,540 B2 | 11/2021 | Gupta | |
| 11,188,908 B2 | 11/2021 | Locke | |
| 11,216,806 B2 | 1/2022 | Mossler | |
| 11,297,958 B2 | 4/2022 | Vukich | |
| 11,334,872 B2 | 5/2022 | Phillips | |
| 11,361,173 B2 | 6/2022 | Edwards | |
| 11,392,933 B2 | 7/2022 | Mossler | |
| 11,392,935 B2 | 7/2022 | Suresh | |

(56) References Cited

U.S. PATENT DOCUMENTS

| | | | |
|---|---|---|---|
| 11,416,844 B1 | 8/2022 | Osterkamp |
| 11,423,392 B1 | 8/2022 | Ho |
| 11,443,292 B2 | 9/2022 | Sherif |
| 11,444,770 B2 | 9/2022 | Wieker |
| 11,461,764 B2 | 10/2022 | Rule |
| 11,481,764 B2 | 10/2022 | Shakkarwar |
| 11,521,213 B2 | 12/2022 | Rule |
| 11,551,200 B1 | 1/2023 | Cook |
| 11,556,918 B2 | 1/2023 | Mestre |
| 11,615,395 B2 | 3/2023 | McHugh |
| 11,777,933 B2 | 10/2023 | Moreton |
| 2001/0010723 A1 | 8/2001 | Pinkas |
| 2001/0029485 A1 | 10/2001 | Brody et al. |
| 2001/0034702 A1 | 10/2001 | Mockett et al. |
| 2001/0054003 A1 | 12/2001 | Chien et al. |
| 2002/0078345 A1 | 6/2002 | Sandhu et al. |
| 2002/0093530 A1 | 7/2002 | Krothapalli et al. |
| 2002/0100808 A1 | 8/2002 | Norwood et al. |
| 2002/0120583 A1 | 8/2002 | Keresman, III et al. |
| 2002/0152116 A1 | 10/2002 | Yan et al. |
| 2002/0153424 A1 | 10/2002 | Li |
| 2002/0165827 A1 | 11/2002 | Gien et al. |
| 2003/0023554 A1 | 1/2003 | Yap et al. |
| 2003/0034873 A1 | 2/2003 | Chase et al. |
| 2003/0055727 A1 | 3/2003 | Walker et al. |
| 2003/0078882 A1 | 4/2003 | Sukeda et al. |
| 2003/0167350 A1 | 9/2003 | Davis et al. |
| 2003/0208449 A1 | 11/2003 | Diao |
| 2003/0220876 A1 | 11/2003 | Burger |
| 2004/0015958 A1 | 1/2004 | Veil et al. |
| 2004/0039919 A1 | 2/2004 | Takayama et al. |
| 2004/0127256 A1 | 7/2004 | Goldthwaite et al. |
| 2004/0215674 A1 | 10/2004 | Odinak et al. |
| 2004/0230799 A1 | 11/2004 | Davis |
| 2005/0044367 A1 | 2/2005 | Gasparini et al. |
| 2005/0075985 A1 | 4/2005 | Cartmell |
| 2005/0081038 A1 | 4/2005 | Arditti Modiano et al. |
| 2005/0138387 A1 | 6/2005 | Lam et al. |
| 2005/0156026 A1 | 7/2005 | Ghosh et al. |
| 2005/0160049 A1 | 7/2005 | Lundholm |
| 2005/0195975 A1 | 9/2005 | Kawakita |
| 2005/0228997 A1 | 10/2005 | Bicker |
| 2005/0247797 A1 | 11/2005 | Ramachandran |
| 2005/0269402 A1 | 12/2005 | Spitzer |
| 2006/0006230 A1 | 1/2006 | Bear et al. |
| 2006/0040726 A1 | 2/2006 | Szrek et al. |
| 2006/0041402 A1 | 2/2006 | Baker |
| 2006/0044153 A1 | 3/2006 | Dawidowsky |
| 2006/0047954 A1 | 3/2006 | Sachdeva et al. |
| 2006/0085848 A1 | 4/2006 | Aissi et al. |
| 2006/0136334 A1 | 6/2006 | Atkinson et al. |
| 2006/0173985 A1 | 8/2006 | Moore |
| 2006/0174331 A1 | 8/2006 | Schuetz |
| 2006/0242698 A1 | 10/2006 | Inskeep et al. |
| 2006/0280338 A1 | 12/2006 | Rabb |
| 2007/0033642 A1 | 2/2007 | Ganesan et al. |
| 2007/0055630 A1 | 3/2007 | Gauthier et al. |
| 2007/0061266 A1 | 3/2007 | Moore et al. |
| 2007/0061487 A1 | 3/2007 | Moore et al. |
| 2007/0116292 A1 | 5/2007 | Kurita et al. |
| 2007/0118745 A1 | 5/2007 | Buer |
| 2007/0197261 A1 | 8/2007 | Humbel |
| 2007/0224969 A1 | 9/2007 | Rao |
| 2007/0241182 A1 | 10/2007 | Buer |
| 2007/0256134 A1 | 11/2007 | Lehtonen et al. |
| 2007/0258594 A1 | 11/2007 | Sandhu et al. |
| 2007/0276765 A1 | 11/2007 | Hazel |
| 2007/0278291 A1 | 12/2007 | Rans et al. |
| 2008/0008315 A1 | 1/2008 | Fontana et al. |
| 2008/0011831 A1 | 1/2008 | Bonalle et al. |
| 2008/0014867 A1 | 1/2008 | Finn |
| 2008/0035738 A1 | 2/2008 | Mullen |
| 2008/0071681 A1 | 3/2008 | Khalid |
| 2008/0072303 A1 | 3/2008 | Syed |
| 2008/0082452 A1 | 4/2008 | Wankmueller |
| 2008/0086767 A1 | 4/2008 | Kulkarni et al. |
| 2008/0099552 A1 | 5/2008 | Grillion |
| 2008/0103968 A1 | 5/2008 | Bies et al. |
| 2008/0109309 A1 | 5/2008 | Landau et al. |
| 2008/0110983 A1 | 5/2008 | Ashfield |
| 2008/0120711 A1 | 5/2008 | Dispensa |
| 2008/0156873 A1 | 7/2008 | Wilhelm et al. |
| 2008/0162312 A1 | 7/2008 | Sklovsky et al. |
| 2008/0164308 A1 | 7/2008 | Aaron et al. |
| 2008/0207307 A1 | 8/2008 | Cunningham, II et al. |
| 2008/0209543 A1 | 8/2008 | Aaron |
| 2008/0223918 A1 | 9/2008 | Williams et al. |
| 2008/0285746 A1 | 11/2008 | Landrock et al. |
| 2008/0308641 A1 | 12/2008 | Finn |
| 2009/0037275 A1 | 2/2009 | Pollio |
| 2009/0048026 A1 | 2/2009 | French |
| 2009/0132417 A1 | 5/2009 | Scipioni et al. |
| 2009/0143104 A1 | 6/2009 | Loh et al. |
| 2009/0171682 A1 | 7/2009 | Dixon et al. |
| 2009/0210308 A1 | 8/2009 | Toomer et al. |
| 2009/0235339 A1 | 9/2009 | Mennes et al. |
| 2009/0249077 A1 | 10/2009 | Gargaro et al. |
| 2009/0282264 A1 | 11/2009 | Amiel et al. |
| 2010/0023449 A1 | 1/2010 | Skowronek et al. |
| 2010/0023455 A1 | 1/2010 | Dispensa et al. |
| 2010/0029202 A1 | 2/2010 | Jolivet et al. |
| 2010/0033310 A1 | 2/2010 | Narendra et al. |
| 2010/0036769 A1 | 2/2010 | Winters et al. |
| 2010/0078471 A1 | 4/2010 | Lin et al. |
| 2010/0082491 A1 | 4/2010 | Rosenblatt et al. |
| 2010/0094754 A1 | 4/2010 | Bertran et al. |
| 2010/0095130 A1 | 4/2010 | Bertran et al. |
| 2010/0100480 A1 | 4/2010 | Altman et al. |
| 2010/0114731 A1 | 5/2010 | Kingston et al. |
| 2010/0192230 A1 | 7/2010 | Steeves et al. |
| 2010/0207742 A1 | 8/2010 | Buhot et al. |
| 2010/0211797 A1 | 8/2010 | Westerveld et al. |
| 2010/0240413 A1 | 9/2010 | He et al. |
| 2010/0257357 A1 | 10/2010 | McClain |
| 2010/0312634 A1 | 12/2010 | Cervenka |
| 2010/0312635 A1 | 12/2010 | Cervenka |
| 2011/0028160 A1 | 2/2011 | Roeding et al. |
| 2011/0035604 A1 | 2/2011 | Habraken |
| 2011/0060631 A1 | 3/2011 | Grossman et al. |
| 2011/0068170 A1 | 3/2011 | Lehman |
| 2011/0084132 A1 | 4/2011 | Tofighbakhsh |
| 2011/0101093 A1 | 5/2011 | Ehrensvard |
| 2011/0113245 A1 | 5/2011 | Varadrajan |
| 2011/0125638 A1 | 5/2011 | Davis et al. |
| 2011/0131415 A1 | 6/2011 | Schneider |
| 2011/0153437 A1 | 6/2011 | Archer et al. |
| 2011/0153496 A1 | 6/2011 | Royyuru |
| 2011/0155801 A1 | 6/2011 | Rowberry |
| 2011/0208658 A1 | 8/2011 | Makhotin |
| 2011/0208965 A1 | 8/2011 | Machani |
| 2011/0211219 A1 | 9/2011 | Bradley |
| 2011/0218911 A1 | 9/2011 | Spodak |
| 2011/0238564 A1 | 9/2011 | Lim et al. |
| 2011/0246780 A1 | 10/2011 | Yeap et al. |
| 2011/0258452 A1 | 10/2011 | Coulier et al. |
| 2011/0280406 A1 | 11/2011 | Ma et al. |
| 2011/0282785 A1 | 11/2011 | Chin |
| 2011/0294418 A1 | 12/2011 | Chen |
| 2011/0312271 A1 | 12/2011 | Ma et al. |
| 2012/0024947 A1 | 2/2012 | Naelon |
| 2012/0030047 A1 | 2/2012 | Fuentes et al. |
| 2012/0030121 A1 | 2/2012 | Grellier |
| 2012/0047071 A1 | 2/2012 | Mullen et al. |
| 2012/0079281 A1 | 3/2012 | Lowenstein et al. |
| 2012/0109735 A1 | 5/2012 | Krawczewicz et al. |
| 2012/0109764 A1 | 5/2012 | Martin et al. |
| 2012/0143703 A1 | 6/2012 | Wall |
| 2012/0143754 A1 | 6/2012 | Patel |
| 2012/0150737 A1 | 6/2012 | Rottink |
| 2012/0178366 A1 | 7/2012 | Levy et al. |
| 2012/0196583 A1 | 8/2012 | Kindo |
| 2012/0207305 A1 | 8/2012 | Gallo et al. |
| 2012/0209773 A1 | 8/2012 | Ranganathan |
| 2012/0238206 A1 | 9/2012 | Singh et al. |

(56)  References Cited

U.S. PATENT DOCUMENTS

| | | |
|---|---|---|
| 2012/0239560 A1 | 9/2012 | Pourfallah et al. |
| 2012/0252350 A1 | 10/2012 | Steinmetz et al. |
| 2012/0254394 A1 | 10/2012 | Barras |
| 2012/0284194 A1 | 11/2012 | Liu et al. |
| 2012/0290472 A1 | 11/2012 | Mullen et al. |
| 2012/0296818 A1 | 11/2012 | Nuzzi et al. |
| 2012/0316992 A1 | 12/2012 | Oborne |
| 2012/0317035 A1 | 12/2012 | Royyuru et al. |
| 2012/0317628 A1 | 12/2012 | Yeager |
| 2013/0005245 A1 | 1/2013 | Royston |
| 2013/0008956 A1 | 1/2013 | Ashfield |
| 2013/0026229 A1 | 1/2013 | Jarman et al. |
| 2013/0030997 A1 | 1/2013 | Spodak |
| 2013/0048713 A1 | 2/2013 | Pan |
| 2013/0054474 A1 | 2/2013 | Yeager |
| 2013/0065564 A1 | 3/2013 | Conner et al. |
| 2013/0080228 A1 | 3/2013 | Fisher |
| 2013/0080229 A1 | 3/2013 | Fisher |
| 2013/0099587 A1 | 4/2013 | Lou |
| 2013/0104251 A1 | 4/2013 | Moore et al. |
| 2013/0106576 A1 | 5/2013 | Hinman et al. |
| 2013/0119130 A1 | 5/2013 | Braams |
| 2013/0130614 A1 | 5/2013 | Busch-Sorensen |
| 2013/0144793 A1 | 6/2013 | Royston |
| 2013/0146657 A1 | 6/2013 | Graef |
| 2013/0171929 A1 | 7/2013 | Adams et al. |
| 2013/0179351 A1 | 7/2013 | Wallner |
| 2013/0185772 A1 | 7/2013 | Jaudon et al. |
| 2013/0191279 A1 | 7/2013 | Calman et al. |
| 2013/0200999 A1 | 8/2013 | Spodak et al. |
| 2013/0211937 A1 | 8/2013 | Elbirt |
| 2013/0216108 A1 | 8/2013 | Hwang et al. |
| 2013/0226791 A1 | 8/2013 | Springer et al. |
| 2013/0226796 A1 | 8/2013 | Jiang et al. |
| 2013/0232082 A1 | 9/2013 | Krawczewicz et al. |
| 2013/0238894 A1 | 9/2013 | Ferg et al. |
| 2013/0282360 A1 | 10/2013 | Shimota et al. |
| 2013/0303085 A1 | 11/2013 | Boucher et al. |
| 2013/0304651 A1 | 11/2013 | Smith |
| 2013/0311363 A1 | 11/2013 | Ramaci |
| 2013/0312082 A1 | 11/2013 | Izu et al. |
| 2013/0314593 A1 | 11/2013 | Reznik et al. |
| 2013/0344857 A1 | 12/2013 | Berionne et al. |
| 2014/0002238 A1 | 1/2014 | Taveau et al. |
| 2014/0019352 A1 | 1/2014 | Shrivastava |
| 2014/0027506 A1 | 1/2014 | Heo et al. |
| 2014/0032409 A1 | 1/2014 | Rosano |
| 2014/0032410 A1 | 1/2014 | Georgiev et al. |
| 2014/0040120 A1 | 2/2014 | Cho et al. |
| 2014/0040139 A1 | 2/2014 | Brudnicki et al. |
| 2014/0040147 A1 | 2/2014 | Varadarakan et al. |
| 2014/0047235 A1 | 2/2014 | Lessiak et al. |
| 2014/0067690 A1 | 3/2014 | Pitroda et al. |
| 2014/0074637 A1 | 3/2014 | Hammad |
| 2014/0074655 A1 | 3/2014 | Lim et al. |
| 2014/0081720 A1 | 3/2014 | Wu |
| 2014/0081785 A1 | 3/2014 | Valadas Preto |
| 2014/0138435 A1 | 5/2014 | Khalid |
| 2014/0171034 A1 | 6/2014 | Aleksin et al. |
| 2014/0171039 A1 | 6/2014 | Bjontegard |
| 2014/0172700 A1 | 6/2014 | Teuwen et al. |
| 2014/0180851 A1 | 6/2014 | Fisher |
| 2014/0208112 A1 | 7/2014 | McDonald et al. |
| 2014/0214674 A1 | 7/2014 | Narula |
| 2014/0229375 A1 | 8/2014 | Zaytzsev et al. |
| 2014/0245391 A1 | 8/2014 | Adenuga |
| 2014/0256251 A1 | 9/2014 | Caceres et al. |
| 2014/0258099 A1 | 9/2014 | Rosano |
| 2014/0258113 A1 | 9/2014 | Gauthier et al. |
| 2014/0258125 A1 | 9/2014 | Gerber et al. |
| 2014/0274179 A1 | 9/2014 | Zhu et al. |
| 2014/0279479 A1 | 9/2014 | Maniar et al. |
| 2014/0337235 A1 | 11/2014 | Van Heerden et al. |
| 2014/0339315 A1 | 11/2014 | Ko |
| 2014/0346860 A1 | 11/2014 | Aubry et al. |
| 2014/0365377 A1 | 12/2014 | Salama |
| 2014/0365780 A1 | 12/2014 | Movassaghi |
| 2014/0379361 A1 | 12/2014 | Mahadkar et al. |
| 2015/0012444 A1 | 1/2015 | Brown et al. |
| 2015/0032635 A1 | 1/2015 | Guise |
| 2015/0071486 A1 | 3/2015 | Rhoads et al. |
| 2015/0073983 A1 | 3/2015 | Bartenstein |
| 2015/0088757 A1 | 3/2015 | Zhou et al. |
| 2015/0089586 A1 | 3/2015 | Ballesteros |
| 2015/0113271 A1 | 4/2015 | Jooste |
| 2015/0134452 A1 | 5/2015 | Williams |
| 2015/0134513 A1 | 5/2015 | Olson |
| 2015/0140960 A1 | 5/2015 | Powell et al. |
| 2015/0154595 A1 | 6/2015 | Collinge et al. |
| 2015/0170138 A1 | 6/2015 | Rao |
| 2015/0178724 A1 | 6/2015 | Ngo et al. |
| 2015/0186871 A1 | 7/2015 | Laracey |
| 2015/0199673 A1 | 7/2015 | Savolainen |
| 2015/0199863 A1 | 7/2015 | Scoggins |
| 2015/0205379 A1 | 7/2015 | Mag et al. |
| 2015/0254637 A1 | 9/2015 | Yang |
| 2015/0302409 A1 | 10/2015 | Malek |
| 2015/0317295 A1 | 11/2015 | Sherry |
| 2015/0317626 A1 | 11/2015 | Ran et al. |
| 2015/0332266 A1 | 11/2015 | Friedlander et al. |
| 2015/0339474 A1 | 11/2015 | Paz et al. |
| 2015/0371234 A1 | 12/2015 | Huang et al. |
| 2016/0012465 A1 | 1/2016 | Sharp |
| 2016/0026997 A1 | 1/2016 | Tsui et al. |
| 2016/0048913 A1 | 2/2016 | Rausaria et al. |
| 2016/0055480 A1 | 2/2016 | Shah |
| 2016/0057619 A1 | 2/2016 | Lopez |
| 2016/0065370 A1 | 3/2016 | Le Saint et al. |
| 2016/0078430 A1 | 3/2016 | Douglas |
| 2016/0087957 A1 | 3/2016 | Shah et al. |
| 2016/0092696 A1 | 3/2016 | Guglani et al. |
| 2016/0148193 A1 | 5/2016 | Kelley et al. |
| 2016/0189143 A1 | 6/2016 | Koeppel |
| 2016/0232523 A1 | 8/2016 | Venot et al. |
| 2016/0239672 A1 | 8/2016 | Khan et al. |
| 2016/0253651 A1 | 9/2016 | Park et al. |
| 2016/0255072 A1 | 9/2016 | Liu |
| 2016/0267486 A1 | 9/2016 | Mitra et al. |
| 2016/0277383 A1 | 9/2016 | Guyomarc'h et al. |
| 2016/0277388 A1 | 9/2016 | Lowe et al. |
| 2016/0307187 A1 | 10/2016 | Guo et al. |
| 2016/0307189 A1 | 10/2016 | Zarakas et al. |
| 2016/0314472 A1 | 10/2016 | Ashfield |
| 2016/0330027 A1 | 11/2016 | Ebrahimi |
| 2016/0335531 A1 | 11/2016 | Mullen et al. |
| 2016/0379217 A1 | 12/2016 | Hammad |
| 2017/0004502 A1 | 1/2017 | Quentin et al. |
| 2017/0011395 A1 | 1/2017 | Pillai et al. |
| 2017/0011406 A1 | 1/2017 | Tunnell et al. |
| 2017/0017957 A1 | 1/2017 | Radu |
| 2017/0017964 A1 | 1/2017 | Janefalkar et al. |
| 2017/0024716 A1 | 1/2017 | Jiam et al. |
| 2017/0039566 A1 | 2/2017 | Schipperheijn |
| 2017/0041759 A1 | 2/2017 | Gantert et al. |
| 2017/0068950 A1 | 3/2017 | Kwon |
| 2017/0103388 A1 | 4/2017 | Pillai et al. |
| 2017/0104739 A1 | 4/2017 | Lansler et al. |
| 2017/0109509 A1 | 4/2017 | Baghdasaryan |
| 2017/0109730 A1 | 4/2017 | Locke et al. |
| 2017/0116447 A1 | 4/2017 | Cimino et al. |
| 2017/0124568 A1 | 5/2017 | Moghadam |
| 2017/0140379 A1 | 5/2017 | Deck |
| 2017/0154328 A1 | 6/2017 | Zarakas et al. |
| 2017/0154333 A1 | 6/2017 | Gleeson et al. |
| 2017/0180134 A1 | 6/2017 | King |
| 2017/0230189 A1 | 8/2017 | Toll et al. |
| 2017/0237301 A1 | 8/2017 | Elad et al. |
| 2017/0289127 A1 | 10/2017 | Hendrick |
| 2017/0295013 A1 | 10/2017 | Claes |
| 2017/0316696 A1 | 11/2017 | Bartel |
| 2017/0317834 A1 | 11/2017 | Smith et al. |
| 2017/0330173 A1 | 11/2017 | Woo et al. |
| 2017/0374070 A1 | 12/2017 | Shah et al. |
| 2018/0034507 A1 | 2/2018 | Wobak et al. |

(56) References Cited

U.S. PATENT DOCUMENTS

| | | | |
|---|---|---|---|
| 2018/0039986 A1 | 2/2018 | Essebag et al. |
| 2018/0039987 A1 | 2/2018 | Molino |
| 2018/0068316 A1 | 3/2018 | Essebag et al. |
| 2018/0129945 A1 | 5/2018 | Saxena et al. |
| 2018/0160255 A1 | 6/2018 | Park |
| 2018/0191501 A1 | 7/2018 | Lindemann |
| 2018/0205712 A1 | 7/2018 | Versteeg et al. |
| 2018/0240106 A1 | 8/2018 | Garrett et al. |
| 2018/0254909 A1 | 9/2018 | Hancock |
| 2018/0268132 A1 | 9/2018 | Buer et al. |
| 2018/0270214 A1 | 9/2018 | Caterino et al. |
| 2018/0294959 A1 | 10/2018 | Traynor et al. |
| 2018/0300716 A1 | 10/2018 | Carlson |
| 2018/0302396 A1 | 10/2018 | Camenisch et al. |
| 2018/0315050 A1 | 11/2018 | Hammad |
| 2018/0316666 A1 | 11/2018 | Koved et al. |
| 2018/0322486 A1 | 11/2018 | Deliwala et al. |
| 2018/0359100 A1 | 12/2018 | Gaddam et al. |
| 2019/0014107 A1 | 1/2019 | George |
| 2019/0019375 A1 | 1/2019 | Foley |
| 2019/0036678 A1 | 1/2019 | Ahmed |
| 2019/0172055 A1 | 6/2019 | Hale |
| 2019/0198212 A1 | 6/2019 | Levy |
| 2019/0238517 A1 | 8/2019 | D'Agostino et al. |
| 2019/0303945 A1 | 10/2019 | Mitra |
| 2020/0302128 A1 | 9/2020 | Rule et al. |
| 2020/0376373 A1 | 12/2020 | Amaitis et al. |
| 2021/0004806 A1 | 1/2021 | Noe |
| 2021/0272098 A1 | 9/2021 | Delsuc |
| 2021/0304189 A1 | 9/2021 | Gupta |
| 2021/0383360 A1 | 12/2021 | Sinha |
| 2021/0406869 A1 | 12/2021 | Pathrabe |
| 2022/0114581 A1 | 4/2022 | Upadhye |
| 2022/0284416 A1 | 9/2022 | Rule |
| 2022/0309509 A1 | 9/2022 | Akgun |
| 2022/0335412 A1 | 10/2022 | Rule |
| 2022/0366410 A1 | 11/2022 | Rule |
| 2022/0398566 A1 | 12/2022 | Rule |
| 2022/0414648 A1 | 12/2022 | Rule |
| 2023/0054157 A1 | 2/2023 | Mao |
| 2023/0065163 A1 | 3/2023 | Vargas |
| 2023/0083785 A1 | 3/2023 | Maiman |
| 2023/0169505 A1 | 6/2023 | Rule |
| 2023/0354020 A1 | 11/2023 | Rule |
| 2023/0359839 A1 | 11/2023 | Lovgren |

FOREIGN PATENT DOCUMENTS

| | | |
|---|---|---|
| CN | 103023643 | 4/2013 |
| CN | 103417202 | 12/2013 |
| EP | 1 085 424 | 3/2001 |
| EP | 1 223 565 | 7/2002 |
| EP | 1 265 186 | 12/2002 |
| EP | 1 783 919 | 5/2007 |
| EP | 2 852 070 | 1/2009 |
| EP | 2 139 196 | 12/2009 |
| EP | 1 469 419 | 2/2012 |
| GB | 2 457 221 | 8/2009 |
| GB | 2 516 861 | 2/2015 |
| GB | 2 551 907 | 1/2018 |
| KR | 101508320 | 4/2015 |
| KR | 20150140132 A | 12/2015 |
| WO | 9910824 A1 | 3/1999 |
| WO | WO 00/49586 | 8/2000 |
| WO | WO 2006070189 | 7/2006 |
| WO | WO 2008055170 | 5/2008 |
| WO | WO 2009025605 | 2/2009 |
| WO | WO 2010049252 | 5/2010 |
| WO | WO 2011112158 | 9/2011 |
| WO | WO 2012001624 | 1/2012 |
| WO | 2013039395 | 3/2013 |
| WO | WO 2013155562 | 10/2013 |
| WO | WO 2013192358 | 12/2013 |
| WO | WO 2014043278 | 3/2014 |
| WO | WO 2014170741 | 10/2014 |
| WO | WO 2015179649 | 11/2015 |
| WO | WO 2015183818 | 12/2015 |
| WO | WO 2016097718 | 6/2016 |
| WO | WO 2016160816 | 10/2016 |
| WO | WO 2016168394 | 10/2016 |
| WO | 2017047855 A1 | 3/2017 |
| WO | WO 2017042375 | 3/2017 |
| WO | WO 2017042400 | 3/2017 |
| WO | WO 2017157859 | 9/2017 |
| WO | WO 2017208063 | 12/2017 |
| WO | WO 2018063809 | 4/2018 |
| WO | WO 2018137888 | 8/2018 |
| WO | 2019022585 A1 | 1/2019 |
| WO | 2021051884 A1 | 3/2021 |
| WO | 2021133492 A1 | 7/2021 |
| WO | 2022108959 A1 | 5/2022 |
| WO | 2022187350 A1 | 9/2022 |
| WO | 2023017943 A1 | 2/2023 |
| WO | 2023064063 A1 | 4/2023 |

OTHER PUBLICATIONS

Haykin M. and Warnar, R., "Smart Card Technology: New Methods for Computer Access Control," Computer Science and Technology NIST Special Publication 500-157:1-60 (1988).

Lehpamer, Harvey, "Component of the RFID System," RFID Design Principles, 2nd edition pp. 133-201 (2012).

Pourghomi, Pardis et al., "A Proposed NFC Payment Application," International Journal of Advanced Computer Science and Applications, vol. 4, No. 8 (2013).

Author Unknown, "CardrefresherSM from American Express®," [online] 2019 [retrieved on Mar. 25, 2019]. Retrieved from Internet URL: https://merchant-channel.americanexpress.com/merchant/en_US/cardrefresher, 2 pages.

Author Unknown, "Add Account Updater to your recurring payment tool," [online] 2018-19 [retrieved on Mar. 25, 2019]. Retrieved from Internet URL: https://www.authorize.net/our-features/account-updater/, 5 pages.

Author Unknown, "Visa® Account Updater for Merchants," [online] 2019 [retrieved on Mar. 25, 2019]. Retrieved from Internet URL: https://usa.visa.com/dam/VCOM/download/merchants/visa-account-updater-product-information-fact-sheet-for-merchants.pdf, 2 pages.

Author Unknown, "Manage the cards that you use with Apple Pay," Apple Support [online] 2019 [retrieved on Mar. 25, 2019]. Retrieved from Internet URL: https://support.apple.com/en-us/HT205583, 5 pages.

Author Unknown, "Contactless Specifications for Payment Systems," EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.

Author Unknown, "EMV Integrated Circuit Card Specifications for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.

Author Unknown, "NFC Guide: All You Need to Know About Near Field Communication" Square Guide [online] 2018 [retrieved on Nov. 13, 2018]. Retrieved from Internet URL: https://squareup.com/guides/nfc, 8 pages.

Profis, S., "Everything you need to know about NFC and mobile payments" CNET Directory [online], 2014 [retrieved on Mar. 25, 2019]. Retrieved from the Internet URL: https://www.cnet.com/how-to/how-nfc-works-and-mobile-payments/, 6 pages.

Cozma, N., "Copy data from other devices in Android 5.0 Lollipop setup" CNET Directory [online] 2014 [retrieved on Mar. 25, 2019]. Retrieved from the Internet URL: https://www.cnet.com/how-to/copy-data-from-other-devices-in-android-5-0-lollipop-setup/, 5 pages.

Kevin, Android Enthusiast, "How to copy text string from nfc tag" StackExchange [online] 2013 [retrieved on Mar. 25, 2019]. Retrieved from the Internet URL: https://android.stackexchange.com/questions/55689/how-to-copy-text-string-from-nfc-tag, 11 pages.

(56) References Cited

OTHER PUBLICATIONS

Author unknown, "Tap & Go Device Setup" Samsung [online] date unknown [retrieved on Mar. 25, 2019]. Retrieved from the Internet URL: https://www.samsung.com/us/switch-me/switch-to-the-galaxy-s-5/app/partial/setup-device/tap-go.html, 1 page.

Author Unknown, "Multiple encryption", Wikipedia [online] 2019 [retrieved on Mar. 25, 2019]. Retrieved from Internet URL: https://en.wikipedia.org/wiki/Multiple_encryption, 4 pages.

Krawczyk, et al., "HMAC: Keyed-Hashing for Message Authentication", Network Working Group RFC:2104 memo [online] 1997 [retrieved on Mar. 25, 2019]. Retrieved from Internet URL: https://tools.ietf.org/html/rfc2104, 12 pages.

Song, et al., "The AES-CMAC Algorithm", Network Working Group RFC: 4493 memo [online] 2006 [retrieved on Mar. 25, 2019]. Retrieved from Internet URL: https://tools.ietf.org/html/rfc4493, 21 pages.

Katz, J., and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.

Adams, D., and Maier, A-K, "Goldbug Big Seven open source crypto-messengers to be compared - : or Comprehensive Confidentiality Review & Audit of GoldBug Encrypting E-Mail-Client & Secure Instant Messenger", Big Seven Study 2016 [online] [retrieved on Mar. 25, 2018]. Retrieved from Internet URL: https://sf.net/projects/goldbug/files/bigseven-crypto-audit.pdf, 309 pages.

Author Unknown, "Triple DES", Wikipedia [online] 2018 [retrieved on Mar. 25, 2019]. Retrieved from Internet URL: https://simple.wikipedia.org/wiki/Triple_DES, 2 pages.

Song, F., and Yun, A.l, "Quantum Security of NMAC and Related Constructions - PRF domain extension against quantum attacks", IACR Cryptology ePrint Archive [online] 2017 [retrieved on Mar. 25, 2019]. Retrieved from Internet URL: https://eprint.iacr.org/2017/509.pdf, 41 pages.

Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.

Berg, Guy, "Fundamentals of EMV" Smart Card Alliance [online] date unknown [retrieved on Mar. 27, 2019]. Retrieved from Internet URL: https://www.securetechalliance.org/resources/media/scap13_preconference/02.pdf, 37 pages.

Pierce, Kevin, "Is the amazon echo NFC compatible,?" Amazon.com Customer Q&A [online] 2016 [retrieved on Mar. 26, 2019]. Retrieved from Internet URL: https://www.amazon.com/ask/questions/Tx1RJXYSPE6XLJD ?_ encodi . . . , 2 pages.

Author Unknown, "Multi-Factor Authentication", idaptive [online] 2019 [retrieved on Mar. 25, 2019]. Retrieved from Internet URL: https://www.centrify.com/products/application-services/adaptive-multi-factor-authentication/risk-based-mfa/, 10 pages.

Author Unknown, "Adaptive Authentication", SecureAuth [online] 2019 [retrieved on Mar. 25, 2019}. Retrieved from Internet URL: https://www.secureauth.com/products/access-management/adaptive-authentication, 7 pages.

Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.

Author Unknown, "Autofill", Computer Hope [online] 2018 [retrieved on Mar. 25, 2019]. Retrieved from Internet URL: https://www.computerhope.com/jargon/a/autofill.htm, 2 pages.

Author Unknown, "Fill out forms automatically", Google Chrome Help [online] 2019 [retrieved on Mar. 25, 2019]. Retrieved from Internet URL: https://support.google.com/chrome/answer/142893?co=GENIE.Platform%3DDesktop&hl=en, 3 pages.

Author unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.

Menghin, M.J., "Power Optimization Techniques for Near Field Communication Systems" 2014 Dissertation at Technical University of Graz [online]. Retrieved from Internet URL: https://diglib.tugraz.at/download.php?id=576a7b910d2d6&location=browse, 135 pages.

Mareli, M., et al., "Experimental evaluation of NFC reliability between an RFID tag and a smartphone" Conference paper (2013) IEEE AFRICON at Mauritius [online] [retrieved on Mar. 25, 2019]. Retrieved from Internet URL: https://core.ac.uk/download/pdf/54204839.pdf, 5 pages.

Davison, A., et al., "MonoSLAM: Real-Time Single Camera Slam", IEEE Transactions on Pattern Analysis and Machine Intelligence 29(6): 1052-1067 (2007).

Barba, R., "Sharing your location with your bank sounds creepy, but it's also useful", Bankrate, LLC [online] 2017 [retrieved on Mar. 25, 2019]. Retrieved from Internet URL: https://www.bankrate.com/banking/banking-app-location-sharing/, 6 pages.

Author unknown: "onetappayment™", [online] Jan. 24, 2019, [retrieved on Mar. 25, 2019]. Retrieved from Internet URL: https://www.payubiz.in/onetap, 4 pages.

Vu et al., (2012). "Distinguishing users with capacitive touch communication" Proceedings of the Annual International Conference on Mobile Computing and Networking, MOBICOM. 10.1145/2348543.2348569.

EMVCo, EMV Card Personalization Specification, version 1.0 (Jun. 2003), 81 pages.

Ullmann et al., (2012). "On-Card User Authentication for Contactless Smart Cards based on Gesture Recognition", LNI, 223-234, 12 pages.

Faraj et al. (2008). "Investigation of Java Smart Card Technology for Multi-Task Applications" J. of Al-Anbar University for Pure Science, vol. 2: No. 1: 2008, 11 pages.

Dhamdhere (2017) "Key Benefits of a Unified Platform for Loyalty, Referral Marketing, and UGC" Annex Cloud [retrieved on Jul. 3, 2019]. Retrieved from Internet URL: https://www.annexcloude.com/blog/benefits-unified-platform/, 13 pages.

The International Search Report and Written Opinion mailed May 9, 2024, for related Int. App. No. PCT/US2024/017022 (10 pages).

Author Unknown, "Global expansion of card tapping mobile OTP for security and convenience is imminent," Jun. 28, 2022, website: https://www.swidch.com/blogs/card-tapping-motp-blog.

Emvco: "EMV Card Personalisation Specification," Aug. 1, 2021, pp. 1-114, Retrieved from the Internet: URL: https://www.emvco.com/specification/?post_id=12467.

Saush, "Getting information from an EMV chip card with Java," Sep. 8, 2006, WordPress, pp. 1-13.

Smart Card Alliance, "Co-Branded Multi-Application Contactless Cards for Transit and Financial Payment," A Smart Card Alliance Transportation Council White Paper (40 pages), Mar. 2008.

* cited by examiner

100

200

400

505

520

Service Provider

510

1234    5678    1234    5678

CARDHOLDER NAME

EXPIRATION DATE

515

500

Receive Client Device
Data and Implicit and
Explicit Case Data
805

Process Implicit Case
Data
810

Determine Case Type
815

Receive User Feedback
820

Determine Instruction for
Optimal Placement of
Contactless Card
825

Determine Instruction for
Optimal Placement of
Contactless Card
830

SYSTEMS AND METHODS FOR DEVICE CASE DETECTION FOR ADAPTIVE NEAR FIELD COMMUNICATION

FIELD OF THE INVENTION

The present disclosure relates to device case detection, and more particularly, to systems, methods, and computer-accessible mediums for device case detection to enable adaptive near field communication with a transmitting device.

BACKGROUND

Modern client devices, such as cellular phones and tablet computers, can interact with transmitting devices (such as contactless cards) using near field communication (NFC). NFC can, for example, facilitate contactless cryptographic authentication of a credit card using the NFC reader a mobile device. Challenges exist in such endeavors, however, due to the variation in the placement of NFC chip within each mobile device, and the presence (or absence) of a wide variety of types of cases that can be encapsulating each mobile device. For example, the specific type of mobile device and mobile device case can alter the manner in which a contactless card has to be situated to a mobile device in order for the mobile device's NFC reader to receive and transmit data to the transmitting device.

Accordingly, it is difficult to instruct users on how to best place such transmitting devices to their mobile devices in order to facilitate a sufficient NFC connection, and without such instruction, many users may be dissuaded from utilizing services that utilize such a NFC connection. Further, existing users of such services can have difficulty when switching mobile device, or adding a new or removing an existing case to their mobile device.

These and other deficiencies exist. Accordingly, there is a need to provide users with an appropriate solution that overcomes these deficiencies to provide personalized instruction on how to place their transmitting device with receiving device to establish a NFC connection.

SUMMARY

Aspects of the present disclosure include systems, methods, and computer-accessible mediums for device case detection to enable adaptive near field communication with a transmitting device according to example embodiments.

In some aspects, the techniques described herein relate to a method for adaptive near field communication, including: receiving, by an application including instructions for execution on a client device, data indicating a type of device from the client device; performing, by the application, at least one selected from the group of an explicit detection process and an implicit detection process to determine a type of case expected to house the client device; determining, by the application, an optimal positioning of a transmitting device for near field communication with the client device based on the type of device and type of case; and displaying, by the application, an indication of an optimal positioning of the transmitting device for near field communication.

In some aspects, the techniques described herein relate to a method, wherein the explicit detection process includes receiving, by the client device, data indicative of a type of case from an electronic component of a case.

In some aspects, the techniques described herein relate to a method, wherein the case includes a battery.

In some aspects, the techniques described herein relate to a method, wherein the implicit detection process includes determining a thickness of the client device using a sensor of the client device when the client device is detected to be placed on a substantially flat surface.

In some aspects, the techniques described herein relate to a method, wherein the sensor of the client device is at least one selected from the group of a camera of the client device and a proximity sensor of the client device.

In some aspects, the techniques described herein relate to a method, wherein the client device is detected to be placed on a substantially flat surface by at least one selected from the group of a gyroscope and an inertial sensor of the client device.

In some aspects, the techniques described herein relate to a method, wherein the implicit detection process is performed during initialization of a service for authentication of the transmitting through the client device.

In some aspects, the techniques described herein relate to a method, further including: determining, by the application, a plurality of types of cases expected house the client device based on the performance of at least one selected from the group of an explicit detection process and an implicit detection process for each of the plurality of types of cases; presenting by the application, each of the plurality of types of cases on the client device; and receiving selection, by the application, of one of the plurality of types of cases.

In some aspects, the techniques described herein relate to a method, wherein the authentication action is a tap of the transmitting device to a communication field of the client device.

In some aspects, the techniques described herein relate to an adaptive near field communication system, including: a transmitting device; and an application including instructions for execution on a client device, wherein the application is configured to: receive data indicating a type of device from the client device; perform at least one selected from the group of an explicit detection process and an implicit detection process to determine a type of case expected to house the client device; determine an optimal positioning of the transmitting device for near field communication with the client device based on the type of device and type of case; and display an indication of the optimal positioning of the transmitting device when an authentication action is performed.

In some aspects, the techniques described herein relate to an adaptive near field communication system, wherein the application is further configured to determine the optimal positioning of the transmitting device based on comparing the type of device and type of case to reference information.

In some aspects, the techniques described herein relate to an adaptive near field communication system, wherein the reference information includes device information and case information from a plurality of types of mobile devices and cases.

In some aspects, the techniques described herein relate to an adaptive near field communication system, wherein the application is further configured to determine the optimal positioning of the transmitting device based on a predictive model.

In some aspects, the techniques described herein relate to an adaptive near field communication system, wherein the predictive model is trained from a training data set including connection data from a plurality of types of mobile devices and cases.

In some aspects, the techniques described herein relate to an adaptive near field communication system, wherein the connection data includes an indication of a strength of a near field communication signal between the client device and at least one selected from the group of a position and an orientation of the transmitting device.

In some aspects, the techniques described herein relate to an adaptive near field communication system, wherein the optimal positioning of includes a position and an orientation of the transmitting device.

In some aspects, the techniques described herein relate to an adaptive near field communication system, wherein, upon a failure to detect an external battery on the client device, the application is further configured to perform the implicit detection process.

In some aspects, the techniques described herein relate to an adaptive near field communication system, wherein the performance of explicit detection is based on charging data.

In some aspects, the techniques described herein relate to an adaptive near field communication system, wherein charging data includes at least one selected from the group of an indication of the maximum capacity of the battery and a duration of the charge on the mobile device.

In some aspects, the techniques described herein relate to a non-transitory computer-accessible medium including computer executable instructions that, when executed on a processor, perform procedures including: receiving data indicating a type of device from the client device; performing at least one selected from the group of an explicit detection process and an implicit detection process to determine a type of case expected to house the client device; determining an optimal positioning of a transmitting device for near field communication with the client device based on the type of device and type of case; and displaying an indication of the optimal positioning of the transmitting device when an authentication action is performed.

Further features of the disclosed designs, and the advantages offered thereby, are explained in greater detail hereinafter with reference to specific example embodiments illustrated in the accompanying drawings.

DETAILED DESCRIPTION OF EXAMPLE EMBODIMENTS

The following description of embodiments provides non-limiting representative examples referencing numerals to particularly describe features and teachings of different aspects of the invention. The embodiments described will be recognized as capable of implementation separately, or in combination, with other embodiments from the description of the embodiments, and it is understood that the features and teachings of any embodiment can be interchangeably combined with the features and teachings of any other embodiment. A person of ordinary skill in the art reviewing the description of embodiments should be able to learn and understand the different described aspects of the invention. The description of embodiments will facilitate understanding of the invention to such an extent that other implementations, not specifically covered but within the knowledge of a person of skill in the art having read the description of embodiments, would be understood to be consistent with an application of the invention.

An objective of some embodiments of the present disclosure is to efficiently determine a type of mobile device, and a type of mobile device case, and to provide customized instructions to an application mobile device on an optimal placement of a transmitting device to the mobile device for NFC communication to perform one or more functions (such as authentication).

In exemplary embodiments, the contactless card can perform authentication and numerous other functions that may otherwise require the user to carry a separate physical token in addition to the contactless card. By employing a contactless interface, contactless cards may be provided with a method to interact and communicate between a user's device (such as a mobile phone) and the card itself. For example, the Europay®, Mastercard®, and Visa® (EMV) protocol, which underlies many credit card transactions, includes an authentication process which suffices for Android® operating systems but presents challenges for iOS®, which is more restrictive regarding near field communication (NFC) usage, as it can be used only in a read-only manner. Exemplary embodiments of the contactless cards described herein utilize NFC technology among other technologies.

Figure 1:
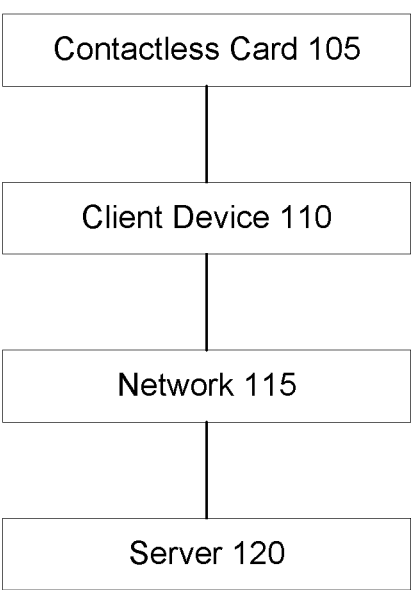
FIG. 1 is a diagram of a data transmission system according to an example embodiment.

FIG. 1 illustrates a data transmission system according to an example embodiment. As further discussed below, system 100 may include contactless card 105, client device 110, network 115, and server 120. Although FIG. 1 illustrates single instances of the components, system 100 may include any number of components.

System 100 may include a transmitting device, such as one or more contactless cards 105, which are further described below with reference to FIGS. 4A-4B. In some embodiments, contactless card 105 may be in wireless communication, utilizing NFC in an example, with client device 110. In other embodiments, the transmitting device may be a network-enabled computer. As referred to herein, a network-enabled computer can include, without limitation, a computer device including, e.g., a server, a client device, a network appliance, a personal computer, a workstation, a phone, a handheld PC, a personal digital assistant, a smart-card (e.g. a contact-based card and a contactless card), a thin client, a fat client, an Internet browser, a kiosk, a tablet, a terminal, an automated teller machine (ATM), or other device. The transmitting device also can be a mobile device; for example, a mobile device can include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

System 100 may include client device 110. In some examples, client device 110 can be a network-enabled computer. The client device 110 also can be a mobile device; for example, a mobile device can include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

Client device 110 may be in communication with one or more servers 120 via one or more networks 115, and may operate as a respective front-end to back-end pair with server 120. Client device 110 may transmit, for example from a mobile device application or other software application executing on client device 110, one or more requests to server 120. The one or more requests may be associated with retrieving data from server 120. Server 120 may receive the one or more requests from client device 110. Based on the one or more requests from client device 110, server 120 may be configured to retrieve the requested data from one or more databases (not shown). Based on receipt of the requested data from the one or more databases, server 120 may be configured to transmit the received data to client device 110, the received data being responsive to one or more requests.

System 100 may include one or more networks 115. In some examples, network 115 may be one or more of a wireless network, a wired network or any combination of wireless network and wired network, and may be configured to connect client device 110 to server 120. For example, network 115 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, network 115 may include, without limitation, telephone lines, fiber optics, IEEE Ethernet 902.3, a wide area network, a wireless personal area network, a LAN, or a global network such as the Internet. In addition, network 115 may support an Internet network, a wireless communication network, a cellular network, or the like, or any combination thereof. Network 115 may further include one network, or any number of the exemplary types of networks mentioned above, operating as a stand-alone network or in cooperation with each other. Network 115 may utilize one or more protocols of one or more network elements to which they are communicatively coupled. Network 115 may translate to or from other protocols to one or more protocols of network devices. Although network 115 is depicted as a single network, it should be appreciated that according to one or more examples, network 115 may comprise a plurality of interconnected networks, such as, for example, the Internet, a service provider's network, a cable television network, corporate networks, such as credit card association networks, and home networks.

System 100 may include one or more servers 120. In some examples, server 120 may include one or more processors, which are coupled to memory. Server 120 may be configured as a central system, server or platform to control and call various data at different times to execute a plurality of workflow actions. Server 120 may be configured to connect to the one or more databases. Server 120 may be connected to at least one client device 110. In some examples, the server 120 may be a network-enabled computer.

For example, the server 120 can be a dedicated server computer, a bladed server, or can be a personal computer, a laptop computer, a notebook computer, a palm top computer, a network computer, mobile devices, a wearable device, or any processor-controlled device capable of supporting the system 100. In some examples, the server 120 can be one or more client devices 110. While FIG. 1 illustrates a single server 120, it is understood that other embodiments can use multiple servers or multiple computer systems as necessary or desired to support the users and can also use back-up or redundant servers to prevent network downtime in the event of a failure of a particular server.

Server 120 can be in data communication with one or more components of system 100. For example, the server 120 can be in data communication with client device 110 (e.g., with an application executing on client device 110) via one or more networks 110. The contactless card 105 can be in communication with one or more servers 120 via one or more networks 115, and can operate as a respective front-end to back-end pair with server 120. The contactless card 105 can transmit one or more requests to server 120 via client device 110 (e.g., via an application executing thereon). The one or more requests can be associated with retrieving data from server 120. Server 120 can receive the one or more requests from contactless card 105. Based on the one or more requests from contactless card 105, server 120 can be configured to retrieve the requested data. Server 120 can be configured to transmit the received data to the contactless card 105 in data communication with the client device 110 (e.g., via an application executing thereon), the received data being responsive to one or more requests.

Figure 2:
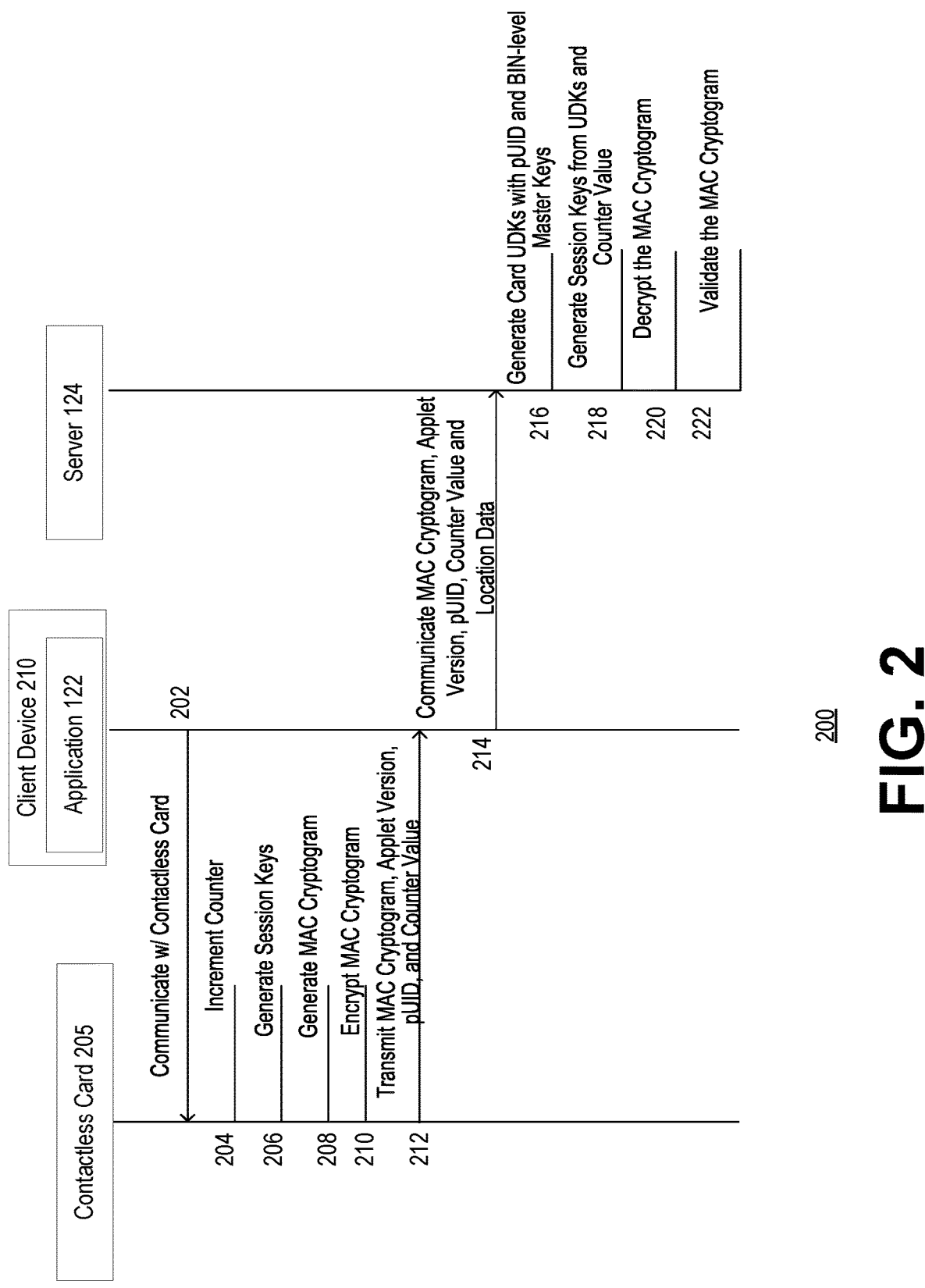
FIG. 2 is a sequence diagram according to an example embodiment.

FIG. 2 is a sequence diagram illustrating an example sequence for providing authenticated access according to one or more embodiments of the present disclosure. System 200 may comprise contactless card 205, client device 210, which may include an application 222, and a server 224.

At step 202, the application 222 communicates with the contactless card 205 (e.g., after being brought near the contactless card 205). Communication between the application 222 and the contactless card 205 may involve the contactless card 205 being sufficiently close to a card reader (not shown) of the client device 210 to enable NFC data transfer between the application 222 and the contactless card 205.

At step 204, a counter value that is maintained by the contactless card can be updated or incremented. The counter value may comprise a number that changes each time the contactless card enters a communication field (e.g., an NFC field generated by the client deice 210), each time data is exchanged between the contactless card 205 and the client device 210, and/or each time a transaction involving the contactless card 205 takes place.

At step 206, two session keys can be generated, and one of the session keys can be used, with the counter value, to generate a message authentication code (MAC) cryptogram and the other session key can be used to encrypt the MAC cryptogram as described further herein. In some examples, one or more cryptographic algorithms can be used. Exemplary cryptographic algorithms can include, without limitation, a MAC algorithm, a hash-based message authentication code (HMAC) algorithm, a cipher-based message authentication code (CMAC) algorithms, the 3DES algorithm, a symmetric HMAC algorithm, and a symmetric CMAC algorithm. In some examples, the MAC cryptogram may function as a digital signature for purposes of verification. Other digital signature algorithms, such as public key asymmetric algorithms, e.g., the Digital Signature Algorithm and the RSA algorithm, or zero knowledge protocols, may be used to perform this verification.

At step 208, the contactless card 205 can generate a MAC cryptogram using the card's unique ID number (pUID), a shared secret (which is known by both the contactless card and the server), and/or applet version (which can indicate a version of the applet, the software, used on the contactless card), with one of the two session keys. At step 210 the contactless card 205 can encrypt the MAC cryptogram using the other session key.

To illustrate steps 202, 204, 206, 208, and 210 a reader, such as application 122, may transmit a message, such as an applet select message, with the applet ID of an NDEF producing applet. Upon confirmation of the selection, a sequence of select file messages followed by read file messages may be transmitted. For example, the sequence may include "Select Capabilities file", "Read Capabilities file", and "Select NDEF file". At this point, a counter value maintained by the contactless card 105 may be updated or incremented, which may be followed by "Read NDEF file." At this point, the message may be generated which may include a header and a shared secret. Session keys may then be generated. The MAC cryptogram may be created from the message, which may include the header and the shared secret. The MAC cryptogram may then be concatenated with one or more blocks of random data, and the MAC cryptogram and a random number (RND) may be encrypted with the session key. Thereafter, the cryptogram and the header may be concatenated, and encoded as ASCII hex and returned in NDEF message format (responsive to the "Read NDEF file" message).

In some examples, the MAC cryptogram may be transmitted as an NDEF tag, and in other examples the MAC cryptogram may be included with a uniform resource indicator (e.g., as a formatted string).

At step 212, the contactless card 205 sends the MAC cryptogram to the application 222 as well as the applet version, pUID and counter value. In some examples, the transmission of occurs via NFC, however, the present disclosure is not limited thereto. In other examples, this communication may occur via Bluetooth, Wi-Fi, or other means of wireless data communication.

At step 214, the application 222 communicates the MAC cryptogram to the server 224 as well as the applet version, pUID and counter value. The application can also transmit other information, such as location data (indicating the location of client device, which is describe in further detail with respect to FIGS. 5 and 6).

At step 216, the server 224 generates card unique derived keys (UDK) with the pUID and bank identification number (BIN) level master keys.

At step 218 the server 224 can generate session keys from the UDKs (generated in step 214) and the counter value.

At step 220 the server can decrypt the MAC cryptogram using one of the session keys.

At step 222 the server can validate the MAC cryptogram based on the pUID, counter, and the shared secret, using one of the session keys.

In some examples, the MAC cryptogram may function as a digital signature for purposes of verification. Other digital signature algorithms, such as public key asymmetric algorithms, e.g., the Digital Signature Algorithm and the RSA algorithm, or zero knowledge protocols, may be used to perform this verification.

Figure 3:
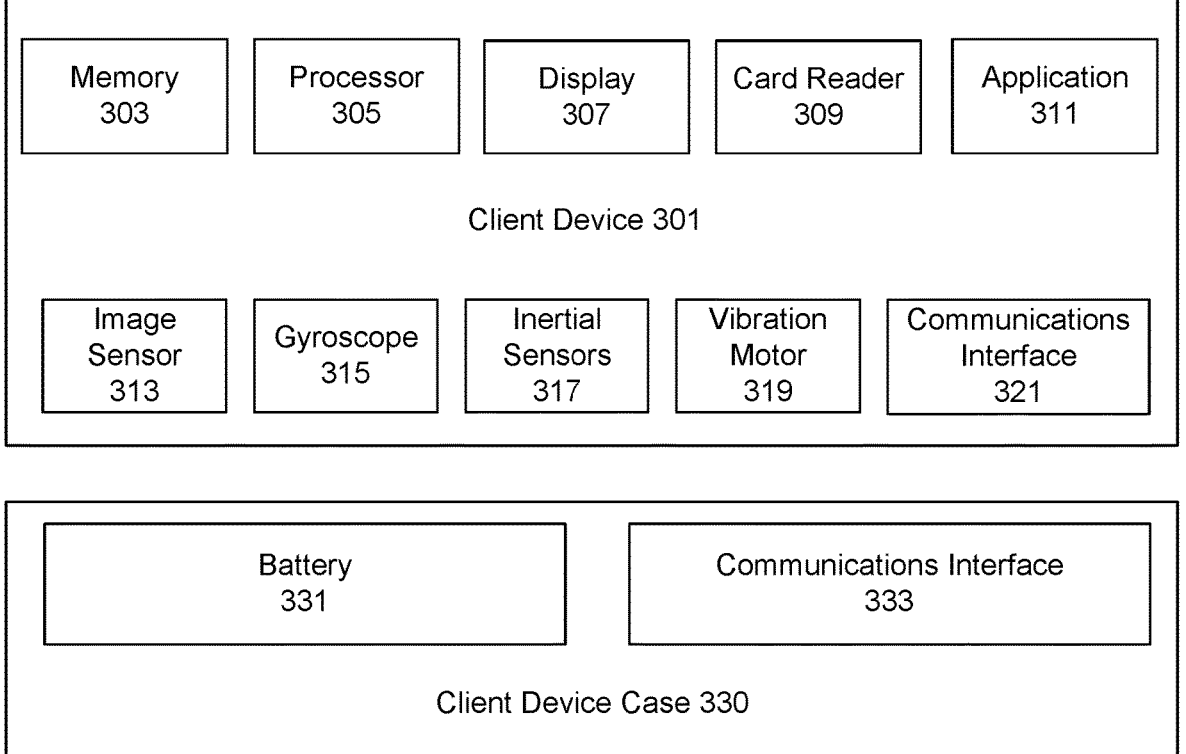
FIG. 3 illustrates a client device and a client device case according to an example embodiment.

FIG. 3 illustrates components of an exemplary client device 301 and client device case 315 described in exemplary embodiments. Client device 301 may be a network-enabled computer. As referred to herein, a network-enabled computer can include, without limitation, a computer device including, e.g., a server, a client device, a network appliance, a personal computer, a workstation, a phone, a handheld PC, a personal digital assistant, a smartcard (e.g. a contact-based card and a contactless card), a thin client, a fat client, an Internet browser, a kiosk, a tablet, a terminal, an automated teller machine (ATM), or other device. The client device 301 also can be a mobile device; for example, a mobile device can include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The client device 301 device can include a processor 305 and a memory 303, and it is understood that the processing circuitry may contain additional components, including processors, memories, error and parity/CRC checkers, data encoders, anticollision algorithms, controllers, command decoders, security primitives and tamperproofing hardware, as necessary to perform the functions described herein. The client device 301 may further include a display 307 and input devices (not shown in FIG. 3). The display 307 may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touch-screen, keyboard, mouse, cursor-control device, touch-screen, microphone, digital camera, video recorder or camcorder. These devices may be used to enter information and interact with the software and other devices described herein.

In some examples, client device 301 of system 100 may execute one or more applications 311, such as software applications, that enable, for example, network communications with one or more components of system 100 and transmit and/or receive data.

Client device can include one or more communications interface, to enable to client device 301 to communicate with other devices, such as a transmitting device, and a server via an external network.

Client device 301 can include a card reader 309, which can be a component that facilitates—communication with a transmitting device, such as a contactless card. In some embodiments, the card reader can be an NFC chip or module, and when the NFC chip or module is in close proximity to the transmitting device. The position of the card reader 309 within the client device may vary depending on the make and model of client device, and the type of card reader. Accordingly, a position in which a transmitting device optimally communicates with a specific card reader 309 of a given client device 301 can vary.

Client device 301 can further include one or more image sensors 313, such as a camera. Image sensor 313 can detect and convey information used to make an image. An image sensor 301 can be provided on the front and/or back surface of the client device. The front surface also including a display 307 of the client device 301.

Client device can also include one or more gyroscope 315. Gyroscope 315 can detect information indicative of an orientation of the client device.

Client device can also include one more inertial sensor 317. Inertial sensor 317 can provide data indicative of a relative movement of the client device.

Client device can also include one or more vibration motor 319. Vibration motor 319 can be actuated to cause a vibration in the client device. For example, vibration motor 319 can cause the client device 301 to vibrate in response to a phone call or text message being received.

Also illustrated in FIG. 3, is a client device case 330. Client device case 330 can be designed to encapsulate and protect client device 301 from damage during ordinary use of the client device 301. Client device case 330 can come in a variety of shapes, and sizes, and in some embodiments can cover all or a portion of various surfaces of the client device. In some embodiments, client device case 330 can include a battery 331, and other hardware components, such as a communications interface 333 to enable communication with other devices, such as client device 301, and/or other devices.

Figure 4:
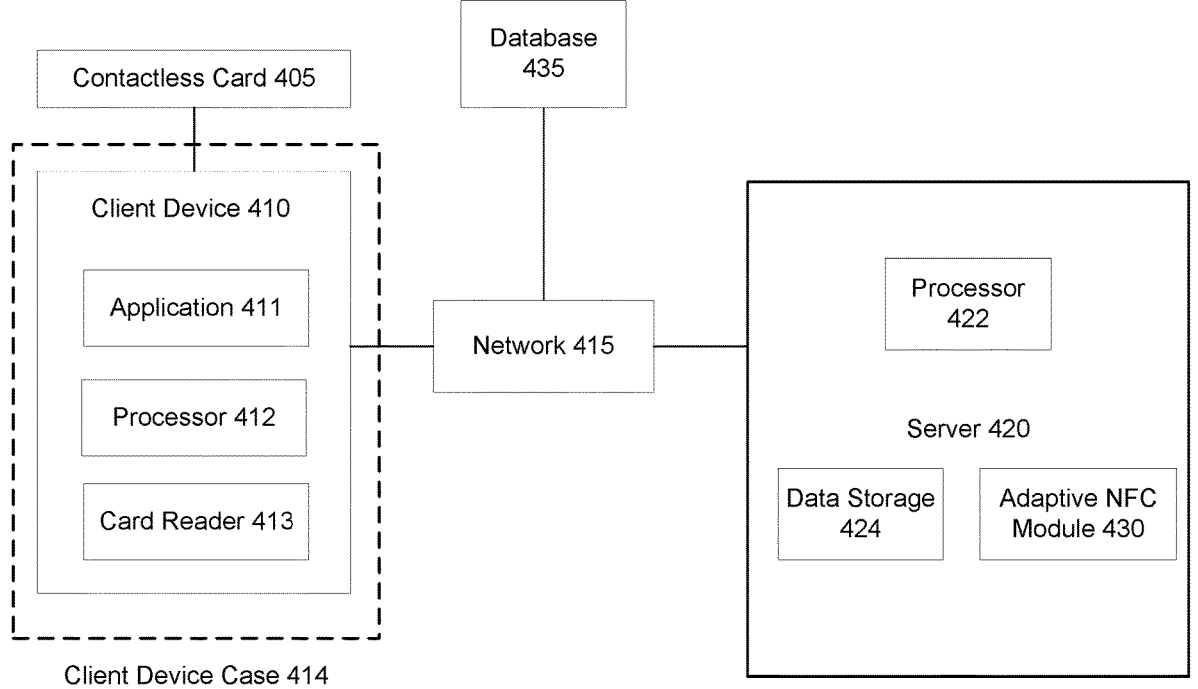
FIG. 4 illustrates a system according to an example embodiment.

FIG. 4 illustrates a system 400 using a contactless card. System 400 may include a contactless card 405, one or more client devices 410, one or more client device cases 414, network 415, servers 420, 425, one or more adaptive NFC modules 430, and a database 435. Although FIG. 4 illustrates single instances of the components, system 400 may include any number of components.

Figure 5A:
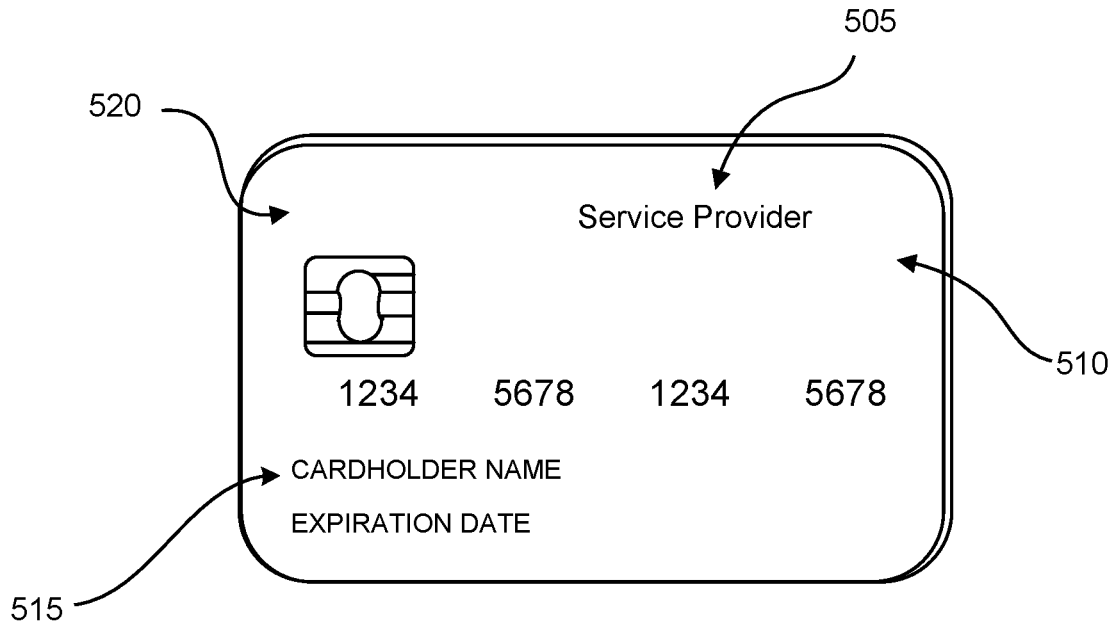
FIG. 5A illustrates a contactless card according to an example embodiment.
Figure 5B:
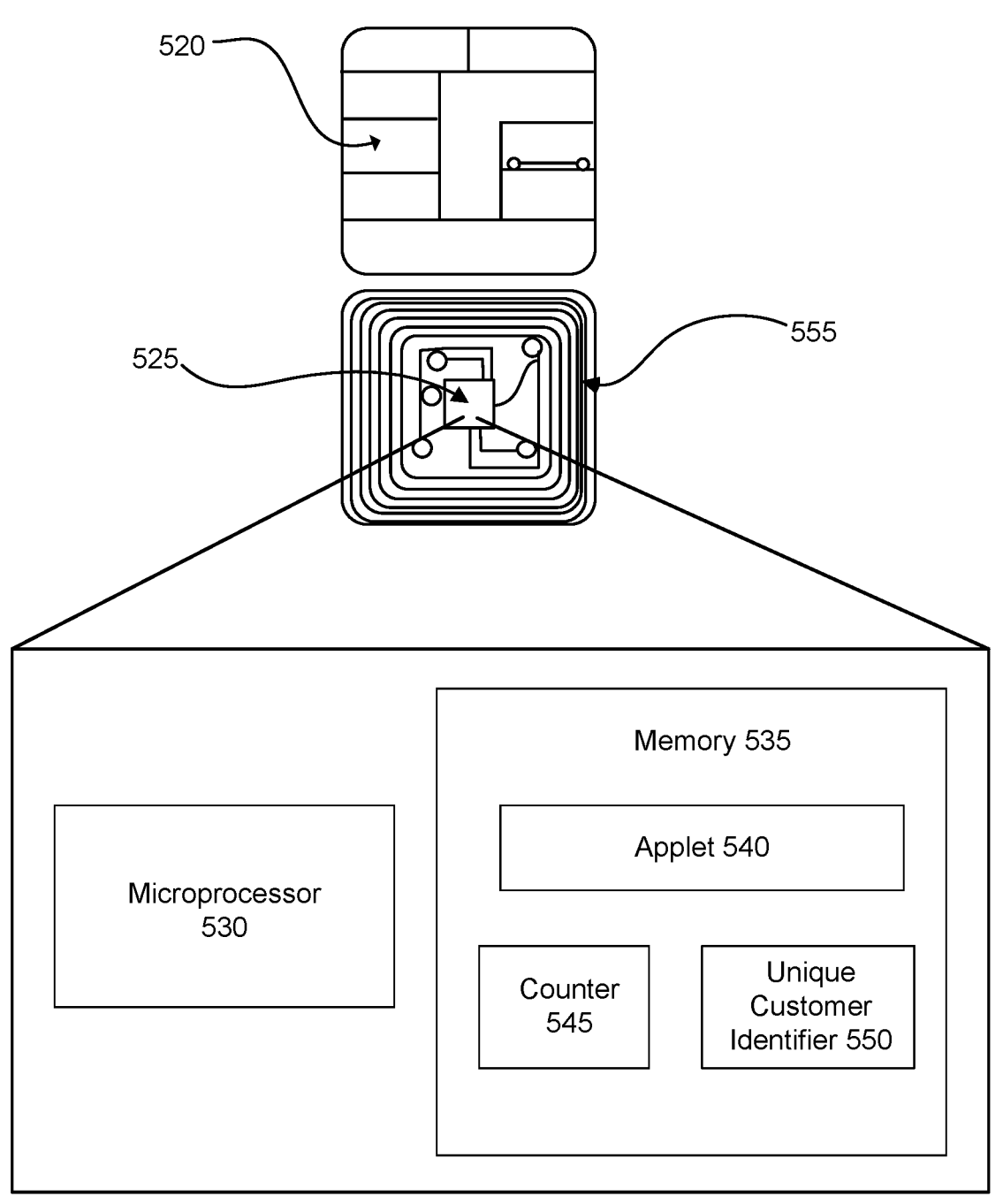
FIG. 5B illustrates a contact pad of a contactless card according to an example embodiment.

System 400 may include one or more contactless cards 405, which are further described with respect to FIGS. 5A-5B. In some examples, contactless card 405 may be in wireless communication, for example NFC communication, with client device 410. For example, contactless card 405 may comprise one or more chips, such as a radio frequency identification chip, configured to communication via NFC or other short-range protocols. In other embodiments, contactless card 405 may communicate with client device 410 through other means including, but not limited to, Bluetooth, satellite, Wi-Fi, wired communications, and/or any combination of wireless and wired connections. According to some embodiments, contactless card 405 may be configured to communicate with card reader 413 of client device 410 through NFC when contactless card 405 is within range of card reader 413. In other examples, communications with contactless card 405 may be accomplished through a physical interface, e.g., a universal serial bus interface or a card swipe interface. Client device 410 can include a client device case 112. Client device case 112 can cover a portion of the client device 112. In some embodiments, the contactless card can communicate with the card reader 413 of the client device 410 through NFC through a portion of the client device case 414. Client device case 414 may be the same, or similar, to the client device case 230 described in reference to FIG. 2.

System 400 may include client device 410, which may be a network-enabled computer. As referred to herein, a network-enabled computer can include, without limitation, a computer device including, e.g., a server, a client device, a network appliance, a personal computer, a workstation, a phone, a handheld PC, a personal digital assistant, a smartcard (e.g. a contact-based card and a contactless card), a thin client, a fat client, an Internet browser, a kiosk, a tablet, a terminal, an automated teller machine (ATM), or other device. The client device 410 also can be a mobile device; for example, a mobile device can include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device. In some examples, the client device 410 may be the same as, or similar to, a client device 110 as described with reference to FIG. 1 and the client device 201 described with reference to FIG. 2.

Client device 410 may be in communication with one or more servers via one or more networks 415. Client device 410 may transmit, for example from an application 411 executing on client device 410, one or more requests to one or more servers 420. The one or more requests may be associated with retrieving data from server 420. Server 420 may receive the one or more requests from client device 410. Based on the one or more requests from client device 410, server 420 may be configured to retrieve the requested data from one or more databases 435. Based on receipt of the requested data from the one or more databases 435, the server 420 may be configured to transmit the received data to client device 410, the received data being responsive to one or more requests.

System 400 may include one or more networks 415. In some examples, network 415 may be one or more of a wireless network, a wired network or any combination of wireless network and wired network, and may be configured to connect client device 415 to server 420 and 425. For example, network 415 may include one or more of a fiber optics network, a passive optical network, a cable network, a cellular network, an Internet network, a satellite network, a wireless LAN, a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, RFID, Wi-Fi, and/or any combination of networks thereof. As a non-limiting example, communications from contactless card 405 and client device 410 may comprise NFC communication, cellular network between client device 410 and a carrier, and Internet between the carrier and a back-end.

In addition, network 415 may include, without limitation, telephone lines, fiber optics, IEEE Ethernet 902.3, a wide area network, a wireless personal area network, a local area network, or a global network such as the Internet. In addition, network 415 may support an Internet network, a wireless communication network, a cellular network, or the like, or any combination thereof. Network 415 may further include one network, or any number of the exemplary types of networks mentioned above, operating as a stand-alone network or in cooperation with each other. Network 415 may utilize one or more protocols of one or more network elements to which they are communicatively coupled. Network 415 may translate to or from other protocols to one or more protocols of network devices. Although network 415 is depicted as a single network, it should be appreciated that according to one or more examples, network 415 may comprise a plurality of interconnected networks, such as, for example, the Internet, a service provider's network, a cable television network, corporate networks, such as credit card association networks, and home networks.

In various examples according to the present disclosure, client device 410 of system 400 may execute one or more applications 411, and include one or more processors 412, and one or more card readers 413. For example, one or more applications 411, such as software applications, may be configured to enable, for example, network communications with one or more components of system 400 and transmit and/or receive data. It is understood that although only single instances of the components of client device 410 are illustrated in FIG. 4, any number of devices 410 may be used. Card reader 413 may be configured to read from and/or communicate with contactless card 405. In conjunction with the one or more applications 411, card reader 413 may communicate with contactless card 405.

The application 411 of any of client device 410 may communicate with the contactless card 405 using short-range wireless communication (e.g., NFC). The application 411 may be configured to interface with a card reader 413 of client device 410 configured to communicate with a contactless card 405. As should be noted, those skilled in the art would understand that a distance of less than twenty centimeters is consistent with NFC range.

In some embodiments, the application 411 communicates through an associated reader (e.g., card reader 413) with the contactless card 405.

In some embodiments, card activation may occur without user authentication. For example, a contactless card 405 may communicate with the application 411 through the card reader 413 of the client device 410 through NFC. The communication (e.g., a tap of the card proximate the card reader 413 of the client device 410) allows the application 411 to read the data associated with the card and perform an activation. In some cases, the tap may activate or launch application 411 and then initiate one or more actions or communications with an account server 425 to activate the card for subsequent use. In some cases, if the application 411 is not installed on client device 410, a tap of the card against the card reader 413 may initiate a download of the application 411 (e.g., navigation to an application download page). Subsequent to installation, a tap of the card may activate or launch the application 411, and then initiate (e.g., via the application or other back-end communication) activation of the card. After activation, the card may be used in various transactions including commercial transactions.

According to some embodiments, the contactless card 405 may include a virtual payment card. In those embodiments, the application 411 may retrieve information associated with the contactless card 405 by accessing a digital wallet implemented on the client device 410, wherein the digital wallet includes the virtual payment card. In some examples, virtual payment card data may include one or more static or dynamically generated virtual card numbers.

According to some embodiments, information about the client device 410 and client device case 410 can be transmitted by the application 411 to the server 420 via the network 415. The information can include a type of client device 410 and client device case 410, which can be ascertained by the systems and methods described herein.

Server 420 may comprise a web server in communication with database 435. In some examples, server 420 may be configured to validate one or more credentials from contactless card 405 and/or client device 410 by comparison with one or more credentials in database 435. Server 425 may be configured to authorize one or more requests, such as payment and transaction, from contactless card 405 and/or client device 410.

Server 420 can include processor 422, data storage 424, and adaptive NFC module 430. Processor 422, which can be a central processing unit (CPU), which can be configured to execute computer program instructions to perform various processes and methods. The at least one CPU can comprise several processors, a single processor, or a single device having multiple processors.

Data storage 424 can be for example, random access memory (RAM) and read only memory (ROM), which can be configured to access and store data and information and computer program instructions. The data storage can also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system, application programs including, for example, web browser application, email application and/or other applications, and data files can be stored. The data storage of the network-enabled computer systems can include electronic information, files, and documents stored in various ways, including, for example, a flat file, indexed file, hierarchical database, relational database, such as a database created and maintained with software from, for example, Oracle® Corporation, Microsoft® Excel® file, Microsoft® Access® file, a solid state storage device, which can include an all flash array, a hybrid array, or a server-side product, enterprise storage, which can include online or cloud storage, or any other storage mechanism.

The data storage 424 can be a read-only memory, write-once read-multiple memory or read/write memory, e.g., RAM, ROM, and EEPROM, and the Server 420 can include one or more of these memories. A read-only memory can be factory programmable as read-only or one-time programmable. One-time programmability provides the opportunity to write once then read many times. A write once/read-multiple memory can be programmed at a point in time after the memory has left the factory. Once the memory is programmed, it cannot be rewritten, but it can be read many times. A read/write memory can be programmed and re-programed many times after leaving the factory. It can also be read many times.

Although depicted as single elements, it should be appreciated that according to one or more embodiments, the server 420 can comprise a plurality of data storage components 424 and processors 422, and other components, such as a communications interface (not shown). The components can be combined, integrated, separated, or duplicated to support various applications. Also, a function described herein as being performed at a particular component can be performed at one or more other components and by one or more other devices instead of or in addition to the function performed at the particular component. Further, the components can be implemented across multiple devices or other components local or remote to one another. Additionally, the components can be moved from one device and added to another device, or can be included in both devices.

Server 420 can also include adaptive NFC module 430, which can be one or more software modules and/or one or more software applications. Adaptive NFC module 430 can determine, with data acquired from client device as described further herein, including distance data and explicit client device case data, a type of client device case, and can generate instructions for an optimal contactless card placement to the client device for optimal NFC communication. Adaptive NFC module can receive client device data, explicit case data, and implicit case data from a client device, process implicit case data, and determine a type of client device case and an optimal contactless card placement based on client device case data. Client device case data can include a repository information pertaining to a wide variety of client device cases that can be used by the adaptive NFC module 430 for readily determining a specific type of client device case.

In some embodiments, the adaptive NFC module 430 can utilize predictive models to determine a type of client device case and an optimal contactless card placement based on client device case data. In some embodiments, the adaptive NFC module can make predictions of the type of client device case, and of an instruction for optimal placement of a contactless card to the client device, based on a limited amount of input data using one or more of the predictive models described herein.

One or more predictions by the adaptive NFC module 430 can be developed by one or more machine learning algorithms and generated by the application of by one or more predictive models. In an embodiment, the machine learning algorithms employed can include at least one selected from the group of gradient boosting machine, logistic regression, neural networks, and a combination thereof, however, it is understood that other machine learning algorithms can be utilized.

For example, to generate predictions, one or more predictive models can utilize the type of client device that each particular case is operable with, material of the type of case, dimensions of the type of case (and in particular the dimension of the type of case which is readily captured during the image sensor detection process, e.g. the width of the case normal to the surface in which an image sensor of the client device faces), information indicative of the relative displacement of a client device housed by the type of case caused by a vibration of a particular magnitude, frequency, and duration, explicit case data for each type of case, and information pertaining to an optimal contactless card placement based on the type of case and client device.

The predictive models described herein can utilize various neural networks. For example the predictive models can utilize Bidirectional Encoder Representations from Transformers (BERT) models. BERT models utilize use multiple layers of so called "attention mechanisms" to process textual data and make predictions. These attention mechanisms effectively allow the BERT model to learn and assign more importance to words from the text input that are more important in making whatever inference is trying to be made.

As further examples, the predictive models described herein can utilize convolutional neural networks (CNNs) or recurrent neural networks (RNNs), to generate the exemplary models. A CNN can include one or more convolutional layers (e.g., often with a subsampling step) and then followed by one or more fully connected layers as in a standard multilayer neural network. CNNs can utilize local connections, and can have tied weights followed by some form of pooling which can result in translation invariant features.

A RNN is a class of artificial neural network where connections between nodes form a directed graph along a sequence. This facilitates the determination of temporal dynamic behavior for a time sequence. Unlike feedforward neural networks, RNNs can use their internal state (e.g., memory) to process sequences of inputs. A RNN can generally refer to two broad classes of networks with a similar general structure, where one is finite impulse and the other is infinite impulse. Both classes of networks exhibit temporal dynamic behavior. A finite impulse recurrent network can be, or can include, a directed acyclic graph that can be unrolled and replaced with a strictly feedforward neural network, while an infinite impulse recurrent network can be, or can include, a directed cyclic graph that cannot be unrolled. Both finite impulse and infinite impulse recurrent networks can have additional stored state, and the storage can be under the direct control of the neural network. The storage can also be replaced by another network or graph, which can incorporate time delays or can have feedback loops. Such controlled states can be referred to as gated state or gated memory, and can be part of long short-term memory networks (LSTMs) and gated recurrent units RNNs can be similar to a network of neuron-like nodes organized into successive "layers," each node in a given layer being connected with a directed e.g., (one-way) connection to every other node in the next successive layer. Each node (e.g., neuron) can have a time-varying real-valued activation. Each connection (e.g., synapse) can have a modifiable real-valued weight. Nodes can either be (i) input nodes (e.g., receiving data from outside the network), (ii) output nodes (e.g., yielding results), or (iii) hidden nodes (e.g., that can modify the data en route from input to output). RNNs can accept an input vector x and give an output vector y. However, the output vectors are based not only by the input just provided in, but also on the entire history of inputs that have been provided in in the past.

For supervised learning in discrete time settings, sequences of real-valued input vectors can arrive at the input nodes, one vector at a time. At any given time step, each non-input unit can compute its current activation (e.g., result) as a nonlinear function of the weighted sum of the activations of all units that connect to it. Supervisor-given target activations can be supplied for some output units at certain time steps. For example, if the input sequence is a speech signal corresponding to a spoken digit, the final target output at the end of the sequence can be a label classifying the digit. In reinforcement learning settings, no teacher provides target signals. Instead, a fitness function, or reward function, can be used to evaluate the RNNs performance, which can influence its input stream through output units connected to actuators that can affect the environment. Each sequence can produce an error as the sum of the deviations of all target signals from the corresponding activations computed by the network. For a training set of numerous sequences, the total error can be the sum of the errors of all individual sequences.

The predictive models described herein can be trained on one or more training datasets, each of which can comprise one or more types of data. In some examples, the training datasets can comprise previously-collected data, such as data collected from previous uses of the same type of systems described herein and data collected from different types of systems. For example, the training data can comprise of client device information, explicit case data, and processed distance data, displacement data and/or vibration data as described further herein. Such training data can be, for example, collected from a plurality of client devices, and/or from client device manufacturers and/or client device case manufacturers. Exemplary data collected from client device manufacturers and/or client device case manufacturers can include, without limitation, client device dimensions, client device operating specifications (e.g., data transmission specifications), an identification of potential case materials compatible with particular client devices, client device case dimensions, client device case materials, client device case material transmissibility characteristics. In some examples, training datasets can contain, explicit case data and/or implicit case data, and can be updated for subsequent training of predictive models when additional explicit case data and/or implicit case data is obtained.

In other examples, the training datasets can comprise continuously-collected data based on the current operation of the system and continuously-collected data from the operation of other systems. In some examples, the training dataset can include anticipated data, such as the anticipated future events, currently scheduled events, and planned future events, for the instant system and/or other systems. In other examples, the training datasets can include previous predictions for the instant system and other types of system, and can further include results data indicative of the accuracy of the previous predictions. In accordance with these examples, the predictive models described herein can be training prior to use and the training can continue with updated data sets that reflect additional information. Training of predictive models can be performed on an ad hoc, periodic, or continuous basis.

The server 420 can have differentiated access to other third party systems (such as systems of banking and other financial entities), including public data source systems via private APIs. The server 420 can also have differentiated access to client devices (e.g., the client devices 410) via private device APIs. The server 420 can make calls to the private APIs utilizing a token to provide a secure communication channel between the server 420 and other third party systems. The device APIs can also provide a secure communication between the client device 410 and the server 420.

FIG. 5A illustrates one or more contactless cards 500, which may comprise a payment card, such as a credit card, debit card, or gift card, issued by a service provider 405 displayed on the front or back of the card 500. In some examples, the payment card may comprise a dual interface contactless payment card. However, it is understood that the contactless card 500 according to the present disclosure may have different characteristics, and the present disclosure does not require a contactless card to be implemented in a payment card. In some examples, the contactless card 500 is not related to a payment card, and may comprise, without limitation, an identification card, a membership card, a transportation card, and an access card.

The contactless card 500 may comprise a substrate 510, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 500 may have physical characteristics compliant with the ID-1 format of the ISO/IEC 7810 standard, and the contactless card may otherwise be compliant with the ISO/IEC 14443 standard.

The contactless card 500 may also include identification information 415 displayed on the front and/or back of the card, and a contact pad 520. The contact pad 520 may be configured to establish contact with another communication device, such as a client device, smart phone, laptop, desktop, or tablet computer. The contactless card 500 may also include processing circuitry, antenna and other components not shown in FIG. 5A. These components may be located behind the contact pad 520 or elsewhere on the substrate 510. The contactless card 500 may also include a magnetic strip or tape, which may be located on the back of the card (not shown in FIG. 5A). As illustrated in FIG. 5B, the contact pad 520 of FIG. 5A may include processing circuitry 425 for storing and processing information, including a microprocessor 530 and a memory 435. It is understood that the processing circuitry 425 may contain additional components, including processors, memories, error and parity/CRC checkers, data encoders, anticollision algorithms, controllers, command decoders, security primitives and tamper-proofing hardware, as necessary to perform the functions described herein.

The memory 435 may be a read-only memory, write-once read-multiple memory or read/write memory, e.g., RAM, ROM, and EEPROM, and the contactless card 500 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. It may also be read many times.

The memory 435 may be configured to store one or more applets 540, one or more counters 445, and a customer identifier 550. The one or more applets 540 may comprise one or more software applications configured to execute on one or more contactless cards, such as Java Card applet. However, it is understood that applets 540 are not limited to Java Card applets, and instead may be any software application operable on contactless cards or other devices having limited memory. The one or more counters 445 may comprise a numeric counter sufficient to store an integer. The customer identifier 550 may comprise a unique alphanumeric identifier assigned to a user of the contactless card 500, and the identifier may distinguish the user of the contactless card from other contactless card users. In some examples, the customer identifier 550 may identify both a customer and an account assigned to that customer and may further identify the contactless card associated with the customer's account.

The processor and memory elements of the foregoing exemplary embodiments are described with reference to the contact pad, but the present disclosure is not limited thereto. It is understood that these elements may be implemented outside of the pad 520 or entirely separate from it, or as further elements in addition to processor 530 and memory 534 elements located within the contact pad 520.

In some examples, the contactless card 500 may comprise one or more antennas 544. The one or more antennas 455 may be placed within the contactless card 500 and around the processing circuitry 425 of the contact pad 520. For example, the one or more antennas 544 may be integral with the processing circuitry 524 and the one or more antennas 455 may be used with an external booster coil. As another example, the one or more antennas 455 may be external to the contact pad 520 and the processing circuitry 425.

In an embodiment, the coil of contactless card 500 may act as the secondary of an air core transformer. The terminal may communicate with the contactless card 500 by cutting power or amplitude modulation. The contactless card 500 may infer the data transmitted from the terminal using the gaps in the contactless card's power connection, which may be functionally maintained through one or more capacitors. The contactless card 500 may communicate back by switching a load on the contactless card's coil or load modulation. Load modulation may be detected in the terminal's coil through interference.

As explained above, the contactless cards 500 may be built on a software platform operable on smart cards or other devices having limited memory, such as JavaCard, and one or more or more applications or applets may be securely executed. Applets may be added to contactless cards to provide a one-time password (OTP) for multifactor authentication (MFA) in various mobile application-based use cases. Applets may be configured to respond to one or more requests, such as near field data exchange requests, from a reader, such as a mobile NFC reader, and produce an NDEF message that comprises a cryptographically secure OTP encoded as an NDEF text tag.

Example embodiments of systems and methods described herein may be configured to provide security factor authentication. The security factor authentication may comprise a plurality of processes. As part of the security factor authentication, a first process may comprise logging in and validating a user via one or more applications executing on a device. As a second process, the user may, responsive to successful login and validation of the first process via the one or more applications, engage in one or more behaviors associated with one or more contactless cards. In effect, the security factor authentication may include both securely proving identity of the user and engaging in one or more types of behaviors, including but not limited to one or more tap gestures, associated with the contactless card. In some examples, the one or more tap gestures may comprise a tap of the contactless card by the user to a device. In some examples, the device may comprise a mobile device, a kiosk, a terminal, a tablet, or any other device configured to process a received tap gesture.

In some examples, the contactless card may be tapped to a device, such as one or more computer kiosks or terminals, to verify identity so as to receive a transactional item responsive to a purchase, such as a coffee. By using the contactless card, a secure method of proving identity in a loyalty program may be established. Securely proving the identity, for example, to obtain a reward, coupon, offer, or the like or receipt of a benefit is established in a manner that is different than merely scanning a bar card. For example, an encrypted transaction may occur between the contactless card and the device, which may configured to process one or more tap gestures. As explained above, the one or more applications may be configured to validate identity of the user and then cause the user to act or respond to it, for example, via one or more tap gestures. In some examples, data for example, bonus points, loyalty points, reward points, healthcare information, etc., may be written back to the contactless card.

In some examples, the contactless card may be tapped to a device, such as a mobile device. As explained above, identity of the user may be verified by the one or more applications which would then grant the user a desired benefit based on verification of the identity.

In some examples, the contactless card may be activated by tapping to a device, such as a mobile device. For example, the contactless card may communicate with an application of the device via a card reader of the device through NFC communication. The communication, in which a tap of the card proximate the card reader of the device may allow the application of the device to read data associated with the contactless card and activate the card. In some examples, the activation may authorize the card to be used to perform other functions, e.g., purchases, access account or restricted information, or other functions. In some examples, the tap may activate or launch the application of the device and then initiate one or more actions or communications with one or more servers to activate the contactless card. If the application is not installed on the device, a tap of the contactless card proximate the card reader may initiate a download of the application, such as navigation to a download page of the application). Subsequent to installation, a tap of the contactless card may activate or launch the application, and then initiate, for example via the application or other back-end communication), activation of the contactless card. After activation, the contactless card may be used in various activities, including without limitation commercial transactions.

In some embodiments, a dedicated application may be configured to execute on a client device to perform the activation of the contactless card. In other embodiments, a webportal, a web-based app, an applet, and/or the like may perform the activation. Activation may be performed on the client device, or the client device may merely act as a go between for the contactless card and an external device (e.g., account server). According to some embodiments, in providing activation, the application may indicate, to the account server, the type of device performing the activation (e.g., personal computer, smartphone, tablet, or point-of-sale (POS) device). Further, the application may output, for transmission, different and/or additional data to the account server depending on the type of device involved. For example, such data may comprise information associated with a merchant, such as merchant type, merchant ID, and information associated with the device type itself, such as POS data and POS ID.

In some embodiments, the example authentication communication protocol may mimic an offline dynamic data authentication protocol of the EMV standard that is commonly performed between a transaction card and a point-of-sale device, with some modifications. For example, because the example authentication protocol is not used to complete a payment transaction with a card issuer/payment processor per se, some data values are not needed, and authentication may be performed without involving real-time online connectivity to the card issuer/payment processor. As is known in the art, POS systems submit transactions including a transaction value to a card issuer. Whether the issuer approves or denies the transaction may be based on if the card issuer recognizes the transaction value. Meanwhile, in certain embodiments of the present disclosure, transactions originating from a mobile device lack the transaction value associated with the POS systems. Therefore, in some embodiments, a dummy transaction value (i.e., a value recognizable to the card issuer and sufficient to allow activation to occur) may be passed as part of the example authentication communication protocol. POS based transactions may also decline transactions based on the number of transaction attempts (e.g., transaction counter). A number of attempts beyond a buffer value may result in a soft decline; the soft decline requiring further verification before accepting the transaction. In some implementations, a buffer value for the transaction counter may be modified to avoid declining legitimate transactions.

In some examples, the contactless card can selectively communicate information depending upon the recipient device (e.g., a client device or POS device). Once tapped, the contactless card can recognize the device to which the tap is directed, and based on this recognition the contactless card can provide appropriate data for that device. This advantageously allows the contactless card to transmit only the information required to complete the instant action or transaction, such as a payment or card authentication. By limiting the transmission of data and avoiding the transmission of unnecessary data, both efficiency and data security can be improved. The recognition and selective communication of information can be applied to a various scenarios, including card activation, balance transfers, account access attempts, commercial transactions, and step-up fraud reduction.

If the contactless card tap is directed to a device running Apple's iOS® operating system, e.g., an iPhone, iPod, or iPad, the contactless card can recognize the iOS® operating system and transmit data appropriate data to communicate with this device. For example, an authentication action can be performed, where the contactless card can be tapped in order to provide the encrypted identity information necessary to authenticate the card using NDEF tags via, e.g., NFC. Similarly, if the contactless card tap is directed to a device running the Android® operating system, e.g., an Android® smartphone or tablet, the contactless card can recognize the Android® operating system and transmit appropriate and data to communicate with this device (such as the encrypted identity information necessary for authentication by the methods described herein).

As another example, the contactless card tap can be directed to a POS device, including without limitation a kiosk, a checkout register, a payment station, or other terminal. Upon performance of the tap, the contactless card can recognize the POS device and transmit only the information necessary for the action (e.g., an authentication action) or transaction. For example, upon recognition of a POS device used to complete a commercial transaction, the contactless card can communicate payment information necessary to complete the transaction under the EMV standard. In some examples, this can be performed following an authentication action and/or successful authentication of the contactless card.

In some examples, the POS devices participating in the transaction can require or specify additional information, e.g., device-specific information, location-specific information, and transaction-specific information, that is to be provided by the contactless card. For example, once the POS device receives a data communication from the contactless card, the POS device can recognize the contactless card and request the additional information necessary to complete an action or transaction.

In some examples the POS device can be affiliated with an authorized merchant or other entity familiar with certain contactless cards or accustomed to performing certain contactless card transactions. However, it is understood such an affiliation is not required for the performance of the described methods.

In some examples, such as a shopping store, grocery store, convenience store, or the like, the contactless card may be tapped to a mobile device without having to open an application, to indicate a desire or intent to utilize one or more of reward points, loyalty points, coupons, offers, or the like to cover one or more purchases. Thus, an intention behind the purchase is provided.

In some examples, the one or more applications may be configured to determine that it was launched via one or more tap gestures of the contactless card, such that a launch occurred at 3:51 pm, that a transaction was processed or took place at 3:56 pm, in order to verify identity of the user.

In some examples, the one or more applications may be configured to control one or more actions responsive to the one or more tap gestures. For example, the one or more actions may comprise collecting rewards, collecting points, determine the most important purchase, determine the least costly purchase, and/or reconfigure, in real-time, to another action.

In some examples, data may be collected on tap behaviors as biometric and/or gestural authentication. For example, a unique identifier that is cryptographically secure and not susceptible to interception may be transmitted to one or more backend services. The unique identifier may be configured to look up secondary information about individual. The secondary information may comprise personally identifiable information about the user. In some examples, the secondary information may be stored within the contactless card.

In some examples, the device may comprise an application that splits bills or check for payment amongst a plurality of individuals. For example, each individual may possess a contactless card, and may be customers of the same issuing financial institution, but it is not necessary. Each of these individuals may receive a push notification on their device, via the application, to split the purchase. Rather than accepting only one card tap to indicate payment, other contactless cards may be used. In some examples, individuals who have different financial institutions may possess contactless cards to provide information to initiate one or more payment requests from the card-tapping individual.

The following example use cases describe examples of particular implementations of the present disclosure. These are intended solely for explanatory purposes and not for purposes of limitation. In one case, a first friend (payor) owes a second friend (payee) a sum of money. Rather than going to an ATM or requiring exchange through a peer-to-peer application, payor wishes to pay via payee's smartphone (or other device) using a contactless card. Payee logs-on to the appropriate application on his smartphone and selects a payment request option. In response, the application requests authentication via payee's contactless card. For example, the application outputs a display requesting that payee tap his contactless card. Once payee taps his contactless card against the screen of his smartphone with the application enabled, the contactless card is read and verified. Next, the application displays a prompt for payor to tap his contactless card to send payment. After the payor taps his contactless card, the application reads the card information and transmits, via an associated processor, a request for payment to payor's card issuer. The card issuer processes the transaction and sends a status indicator of the transaction to the smartphone. The application then outputs for display the status indicator of the transaction.

In another example case, a credit card customer may receive a new credit card (or debit card, other payment card, or any other card requiring activation) in the mail. Rather than activating the card by calling a provided telephone number associated with the card issuer or visiting a website, the customer may decide to activate the card via an application on his or her device (e.g., a mobile device such as a smartphone). The customer may select the card activation feature from the application's menu that is displayed on a display of the device. The application may prompt the customer to tap his or her credit card against the screen. Upon tapping the credit card against the screen of the device, the application may be configured to communicate with a server, such as a card issuer server which activates the customer's card. The application may then display a message indicating successful activation of the card. The card activation would then be complete.

Figure 6:
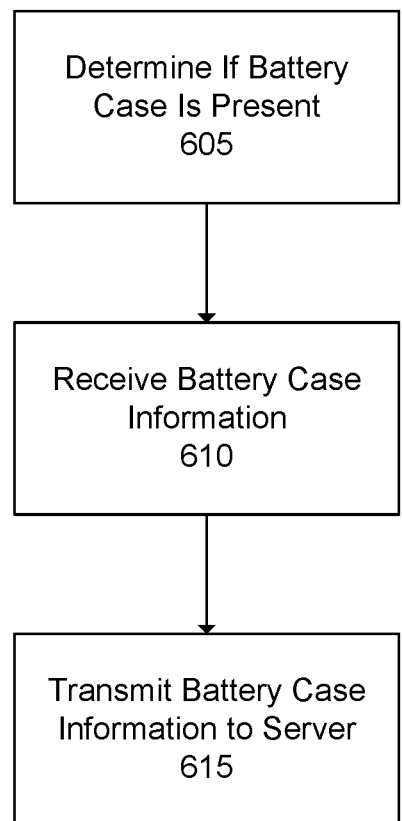
FIG. 6 illustrates an explicit client device case detection process according to an example embodiment.

FIG. 6 illustrates an example embodiment of an explicit client device case detection process. Explicit detection process can be performed when the client device case encapsulating, or covering the client device, has electronic components, such as a battery, and/or a port for charging the battery (and the battery of the phone).

At step 605, an application of the client device can transmit a query to the client device case to determine if a battery case is present. The client device case can contain a battery, and in some instances, a processor and communication interface. The application on the client device can, in some embodiments, make a call to specific components of the client device, and/or client device case to determine the presence of the phone battery case. In other embodiments, the application can infer the existence of a battery case by monitoring charging characteristics of the client device over a period of time. The client device application, can for example, monitor a GPS coordinates, and or inertial sensors of the client device, whether and how long a client device is being charged, and determine whether the client device is moving and whether it is charging while moving.

At step 610, if it is determined that a battery case is present, the client device application can receive explicit case data from components of the batter case and/or client device, and/or can otherwise infer explicit case data. The following exemplary fields of explicit case data can be obtained by the client device application:

EXTRA-PRESENT: indicates whether an additional battery is present.

EXTRA-TECHNOLOGY: Indicates the technology of the battery (this field can contain a string indicating additional information about the battery.

BATTERY_PROPERTY_CAPACITY: indicates the current capacity of the battery, e.g., how long the battery case can power the client device for with the given charge.

BATTERY_PLUGGED: Indicates whether the battery case is currently being charged over USB (or some other type of connection, e.g. USB-C).

BATTERY_PROPERTY_CHARGE_COUNTER: Indicates the maximum capacity of the battery of the battery case.

In some instances, the aforementioned explicit case data can be obtained explicitly, through calling relevant APIs to the client device and/or client device case, and in other embodiments, the client device application can infer explicit information about a battery case by monitoring the charging characteristics of the client device.

At step 615, the explicit case data can be transmitted by the client device application to the server. As described in further detail herein, the explicit case data can be used to ascertain the type of client device case, and to provide instructions as to optimal placement of the contactless card to the client device for performing NFC card reading.

Figure 7:
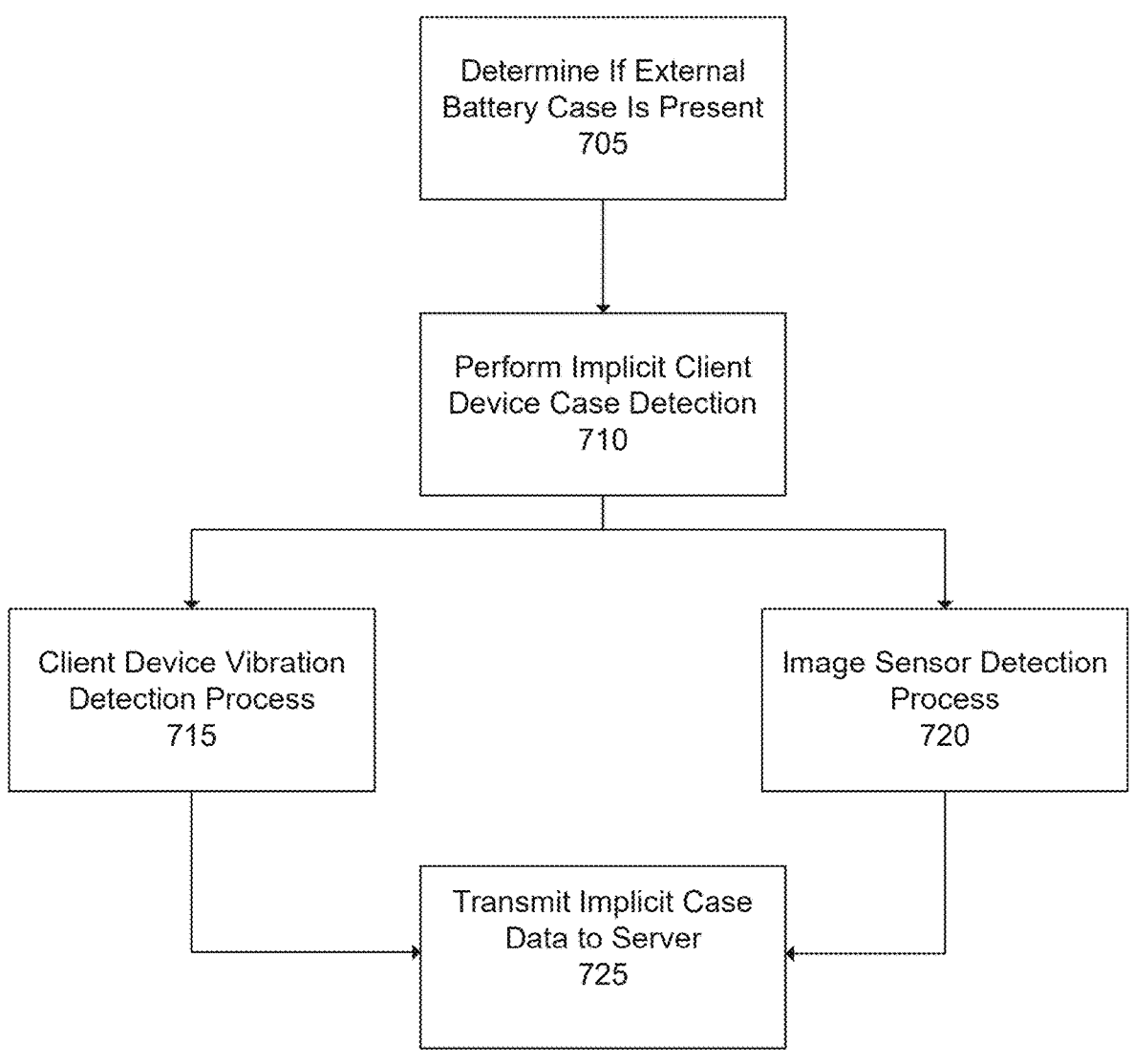
FIG. 7 illustrates an implicit client device case detection process according to an example embodiment.

FIG. 7 illustrates an example embodiment of an implicit client device case detection process. At step 705, a client device application can determine whether an external battery case is present, by for example, utilizing the method described in reference to FIG. 6.

At step 710, if it is determined that no battery case is present, the client device application can determine to perform implicit client device case detection. In some embodiments, the implicit client device case detection is performed even if a battery case is present.

In some embodiments, the implicit case detection process 710 can involve a vibration detection process 715. In such a case, a user can be instructed to lay their client device flat on a flat or substantially flat surface, such as a table, a counter, a chair, a desk, a floor, and or other flat or substantially flat surface. The client device application can cause the vibration motor of the client device to actuate, causing the client device to vibrate while laying flat on the flat or substantially flat surface. The gyroscope and/or internal sensors of the client device can collect displacement data, indicating the relative displacement of the client device while the vibration motor is actuated. The displacement data can indicate the extent that the client device has been displaced during the vibration, as well as the speed, and acceleration of the client device while it is vibrating. The displacement data, as well as vibration data (i.e. data reflective of the frequency, duration, and magnitude of the vibration during the vibration detection process) can be transmitted to the server by the client device application. The displacement data and vibration data can, in combination, be used to determine a type of case housing the client device by comparing the displacement data and vibration data of known client device and client device case types to the one being measured.

In some embodiments, the implicit case detection process 710 can involve an image sensor detection process 720. A user can be instructed to lay their client device flat on a flat or substantially flat surface, with an image sensor of the client device facing the flat or substantially flat surface so that the image sensor of the client device captures an image of the flat or substantially flat surface. While the client device lay flat on the flat or substantially flat surface, the image sensor can capture images of the surface that the client device is lying on. In some embodiments, a flash can be used when capturing an image with the image sensor. The captured images, are a form of distance data as used herein, and can be processed to determine an approximate distance away from the flat or substantially flat surface the client device is laying on. In alternative embodiments, an infrared ("IR") sensor (such as an IR blaster), a position sensor, proximity sensor, or some other sensor of the client device can be used instead, or in combination with one or more images captured from the image sensor device to capture distance data to ascertain the relative distance the client device is to a flat or substantially flat surface it is laying on. In some embodiments, the user can be instructed to lay a different surface of their client device on the flat or substantially flat surface, and this process can be repeated to capture distance data indicative of other dimensions of the client device case.

The instructions to perform image sensor detection process 720 and the vibration detection process 715 when the client device has one more client device applications open. The one or more client device application can display instructions for the user to perform image sensor detection process 720 and/or the vibration detection process 715.

In some embodiments, the vibration detection process 715 and/or the image sensor detection process 720 can occur when a user initially logs into the client device application for installing a service to utilize a contactless card in the manner described herein. In other embodiments, the vibration detection process 715 and/or image sensor detection process 720 can be performed based on manual setting by the user, or a user can be prompted to perform one or both of the vibration detection process and image sensor detection process after, for example, a predetermined time from when an authentication request using the contactless card and the client device is expected to occur. In such a case, the user can be directed to open the client application in order to perform the vibration detection process and/or image sensor detection process.

In some embodiments, the client device application can process the distance data to determine an approximate distance from the flat or substantially flat surface with respect to various surfaces of the client device after the performance of the image sensor detection process 715 and/or the vibration detection process 720. In other embodiments, the distance data can be transmitted to a server, and the processing of the distance data can be performed by a processor of the server. In this manner, dimensions of the client device case, such as width and/or thickness, can be determined.

At step 725 the implicit case data (e.g. displacement data, vibration data and/or the distance data) can be transmitted to the server for processing. In addition, client device information (such as the make and model of the client device, and operating system of the client device) and be transmitted to the server by the client device application. In alternative embodiments, the implicit case data (displacement data, vibration data and/or the distance data) can be processed by the processor of the client device using the client device application before being transmitted to the server.

Figure 8:
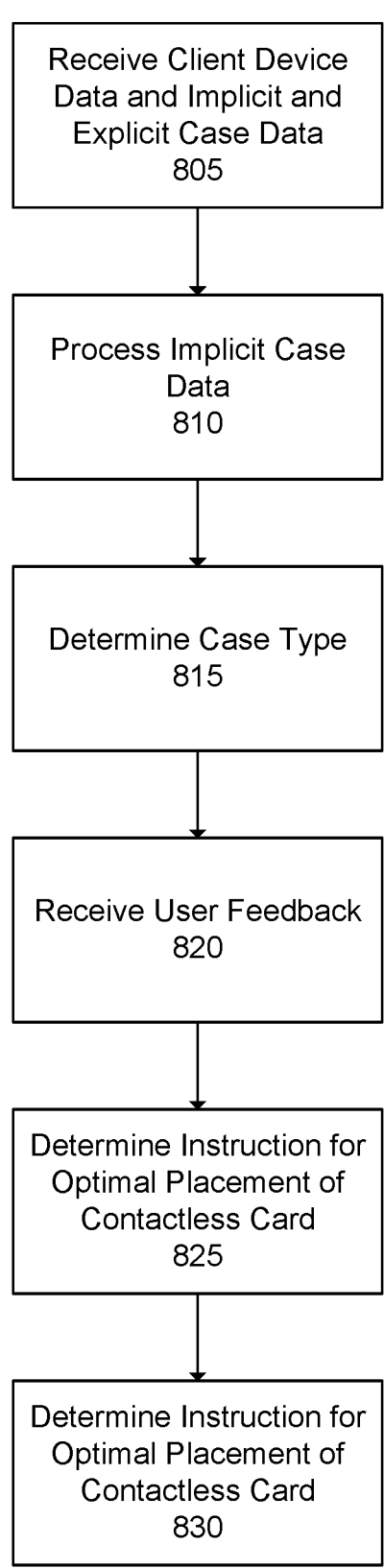
FIG. 8 illustrates a process for generating an instruction for an optimal contactless card placement to the client device to enable NFC communication according to an example embodiment.

FIG. 8 illustrates an exemplary process for generating an instruction for an optimal contactless card placement to the client device for optimal NFC communication. While reference is made to a contactless card, it is understood that exemplary processes can be used with other transmitting devices and/or network-enabled computers.

At step 805 client device data, distance data, displacement data, vibration data, and/or explicit case data is received from the client device. Client device data can indicate the type of client device (e.g. iPhone 12), and other characteristics of the client device (such as operating system, charging information, etc.). Distance data, displacement data, and vibration data can be generated from the implicit case detection process described with respect to FIG. 7, and explicit case data can be generated from an explicit case detection process described with respect to FIG. 6.

At step 810 implicit case data (e.g. distance data, vibration data, and displacement data) can be processed at the server. The distance data can be processed to determine one or more dimensions of the client device case. For example, distance data can include raw images captured by the image sensor, and the server can process such raw images to ascertain the relative distance that an flat or substantially flat surface is away from the image sensor, and based on known characteristics of the type of device (such as the dimensions of the phone case, and bezel size), one or more dimensions of the case can be estimated.

Vibration data and displacement data can be processed to indicate the dimensions of the client device case, and other characteristics of the client device case (such as what material the client device case is made out of). A component of the server (e.g. the adaptive NFC module) can determine characteristics of the client device case based on the frequency and magnitude of the vibration caused by the vibration motor, and the displacement of the client device measured by the inertial sensors and/or gyroscope of the client device.

In some embodiments, the displacement data and vibration data can be compared to the displacement caused to each of a wide variety of types of cases, all of which information can be indicated in client device information. In such a case, the displacement data and vibration data can be processed to enable such a comparison, as the vibration motors, weight of each client device, and other physical characteristics can be normalized by the adaptive NFC module to enable easy comparison.

At step 815 the client device information, explicit case data, and processed distance data displacement data, and/or vibration data can be used to determine one or more types of case expected to house the client device. In some embodiments, any known case dimensions, vibration data, and/or the explicit case data ascertained via the client device application can be compared to client device case data. Client device case data can include a repository of characteristics for a wide variety of client device cases. Client device case data can include fields indicative of the type of client device that each particular case is operable with, material of the type of case, dimensions of the type of case (and in particular the dimension of the type of case which is readily captured during the image sensor detection process, e.g. the width of the case normal to the surface in which an image sensor of the client device faces), information indicative of the relative displacement of a client device housed by the type of case caused by a vibration of a particular magnitude, frequency, and duration, explicit case data for each type of case, and information pertaining to an optimal contactless card placement based on the type of case and client device. In some embodiments, this step can be performed by the adaptive NFC module of the server.

In some embodiments, the adaptive NFC module can utilize a predictive model to determine the case expected to house the client device. For example, the NFC module can train a variety of machine learning models with client device case information and generate a predictive model which can efficiently determine a type of client device case based on a variety of inputs (e.g., client device information, explicit case data, and processed distance data, displacement data and/or vibration data).

At step 820 user feedback as to the type of client device can be received. In some embodiments when more than one type of client device case is expected to house the client device, the server can transmit to the client device a list of each the types of cases expected to house the client device. A client device application can present to the user, each of the types of cases expected to the house the client device, and the user can select which specific case, is indeed housing the client device. In some embodiments, the client device can display an image of the expected types of client device cases, and include a description thereof of each. After selection of the type of client device case by the user, the selection can be transmitted back to the server.

At step 825 an instruction for an optimal placement of a contactless card to the client device can be determined once a type of case has been identified. The determination can be made based on client device case data. The client device case data can indicate, an optimal placement of a contactless card to a given client device depending on the type of case housing the client device. Client device case data can include such data based on experimentation. In instances in which client device data does not indicate the optimal placement of a contactless card to a given type of client device and case, a predictive model can determine the optimal placement by considering the instructions for the optimal placement of a contactless card to similar types of client devices and cases At step 830 the instruction for optimal placement of a contactless card to the client device can be transmitted to the client device and displayed. The instruction can be displayed when a user is prompted to perform a tap of the contactless card to the client device for another purpose (e.g. for authentication, or for payment). In exemplary embodiments, the instruction is generated before the user is prompted to perform the tap or other contactless gesture of the contactless card to the client device, so that there is very little loading time on instructing the user.

In some examples, the present disclosure refers to a tap of the contactless card. However, it is understood that the present disclosure is not limited to a tap, and that the present disclosure includes other gestures (e.g., a wave or other movement of the card).

It is further noted that the systems and methods described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of data storage. For example, data storage may include random access memory (RAM) and read only memory (ROM), which may be configured to access and store data and information and computer program instructions. Data storage may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, and any type of tangible and non-transitory storage medium), where the files that comprise an operating system, application programs including, for example, web browser application, email application and/or other applications, and data files may be stored. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, a solid state storage device, which may include a flash array, a hybrid array, or a server-side product, enterprise storage, which may include online or cloud storage, or any other storage mechanism. Moreover, the figures illustrate various components (e.g., servers, computers, processors, etc.) separately. The functions described as being performed at various components may be performed at other components, and the various components may be combined or separated. Other modifications also may be made.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "some examples," "other examples," "one example," "an example," "various examples," "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrases "in one example," "in one embodiment," or "in one implementation" does not necessarily refer to the same example, embodiment, or implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for adaptive near field communication, comprising:
   receiving, by an application comprising instructions for execution on a client device, data indicating a type of device from the client device;
   performing, by the application, at least one selected from the group of an explicit detection process and an implicit detection process to determine a type of case expected to house the client device;
   comparing, by the application, the type of device and type of case to reference information;
   determining, by the application, an optimal positioning of a transmitting device for near field communication with the client device based on the comparison; and
   displaying, by the application, an indication of an optimal positioning of the transmitting device for near field communication.

2. The method of claim 1, wherein the explicit detection process includes receiving, by the client device, data indicative of a type of case from an electronic component of a case.

3. The method of claim 2, wherein the case includes a battery.

4. The method of claim 1, wherein the implicit detection process includes determining a thickness of the client device using a sensor of the client device when the client device is detected to be placed on a substantially flat surface.

5. The method of claim 4, wherein the sensor of the client device is at least one selected from the group of a camera of the client device and a proximity sensor of the client device.

6. The method of claim 4, wherein the client device is detected to be placed on a substantially flat surface by at least one selected from the group of a gyroscope and an inertial sensor of the client device.

7. The method of claim 4, wherein the implicit detection process is performed during initialization of a service for authentication of the transmitting through the client device.

8. The method of claim 1, further comprising:

determining, by the application, a plurality of types of cases expected house the client device based on the performance of at least one selected from the group of an explicit detection process and an implicit detection process for each of the plurality of types of cases;

presenting by the application, each of the plurality of types of cases on the client device; and receiving selection, by the application, of one of the plurality of types of cases.

9. The method of claim 1, wherein an authentication action is a tap of the transmitting device to a communication field of the client device.

10. An adaptive near field communication system, comprising:

a transmitting device; and an application comprising instructions for execution on a client device, wherein the application is configured to:

receive data indicating a type of device from the client device;

perform at least one selected from the group of an explicit detection process and an implicit detection process to determine a type of case expected to house the client device;

compare the type of device and type of case to reference information;

determine an optimal positioning of the transmitting device for near field communication with the client device based on the comparison; and display an indication of the optimal positioning of the transmitting device when an authentication action is performed.

11. The adaptive near field communication system of claim 10, wherein the reference information includes device information and case information from a plurality of types of mobile devices and cases.

12. The adaptive near field communication system of claim 10, wherein the application is further configured to determine the optimal positioning of the transmitting device based on a predictive model.

13. The adaptive near field communication system of claim 12, wherein the predictive model is trained from a training data set including connection data from a plurality of types of mobile devices and cases.

14. The adaptive near field communication system of claim 13, wherein the connection data includes an indication of a strength of a near field communication signal between the client device and at least one selected from the group of a position and an orientation of the transmitting device.

15. The adaptive near field communication system of claim 10, wherein the optimal positioning of the transmitting device includes a position and an orientation of the transmitting device.

16. The adaptive near field communication system of claim 10, wherein, upon a failure to detect an external battery on the client device, the application is further configured to perform the implicit detection process.

17. The adaptive near field communication system of claim 10, wherein the performance of explicit detection is based on charging data.

18. The adaptive near field communication system of claim 17, wherein charging data includes at least one selected from the group of an indication of the maximum capacity of a battery and a duration of the charge on the client device.

19. A non-transitory computer-accessible medium comprising computer executable instructions that, when executed on a processor, perform procedures comprising:

receiving data indicating a type of device from a client device;

performing at least one selected from the group of an explicit detection process and an implicit detection process to determine a type of case expected to house the client device;

comparing the type of device and type of case to reference information;

determining an optimal positioning of a transmitting device for near field communication with the client device based on the comparison; and displaying an indication of the optimal positioning of the transmitting device when an authentication action is performed.

20. The non-transitory computer-accessible medium of claim 19, wherein the implicit detection process includes determining a thickness of the client device using a sensor of the client device when the client device is detected to be placed on a substantially flat surface.

* * * * *